United States Patent
Iura et al.

(10) Patent No.: US 7,317,292 B2
(45) Date of Patent: Jan. 8, 2008

(54) AC MOTOR CONTROL METHOD AND CONTROL DEVICE

(75) Inventors: Hideaki Iura, Fukuoka (JP); Tohru Kai, Fukuoka (JP)

(73) Assignee: Kabushiki Kaisha Yaskawa Denki, Fukuoka (JP)

( * ) Notice: Subject to any disclaimer, the term of this patent is extended or adjusted under 35 U.S.C. 154(b) by 70 days.

(21) Appl. No.: 10/575,966

(22) PCT Filed: Oct. 4, 2004

(86) PCT No.: PCT/JP2004/014583

§ 371 (c)(1),
(2), (4) Date: Apr. 14, 2006

(87) PCT Pub. No.: WO2005/039035

PCT Pub. Date: Apr. 28, 2005

(65) Prior Publication Data

US 2007/0029963 A1    Feb. 8, 2007

(30) Foreign Application Priority Data

Oct. 17, 2003  (JP)  ............................. 2003-358187

(51) Int. Cl.
*H02P 27/08*  (2006.01)
*H02M 5/458*  (2006.01)

(52) U.S. Cl. ...................... 318/434; 318/798; 318/811; 318/803; 318/812; 363/37

(58) Field of Classification Search .............. 318/432, 318/434, 720, 811; 363/37, 40
See application file for complete search history.

(56) References Cited

U.S. PATENT DOCUMENTS

| | | | | |
|---|---|---|---|---|
| 5,705,904 A | * | 1/1998 | Kuriyama | 318/439 |
| 5,808,428 A | * | 9/1998 | Ito et al. | 318/139 |
| 6,437,997 B1 | * | 8/2002 | Inarida et al. | 363/37 |

(Continued)

FOREIGN PATENT DOCUMENTS

JP    57009278 A  *  1/1982

(Continued)

*Primary Examiner*—Lincoln Donovan
*Assistant Examiner*—Eduardo Colon
(74) *Attorney, Agent, or Firm*—Sughrue Mion, PLLC

(57) ABSTRACT

It is possible to control the DC intermediate voltage to be constant without using a device for returning regenerative resistance or regenerative energy to a power source and to safely continue operation of an AC motor even if an instantaneous stop occurs. An AC motor control method includes: a step of detecting a stop of AC power supply by power supply stop detection means arranged in a power converter, a step of outputting a speed reduction start instruction to an inverter unit, a step of calculating a speed reduction rate 1 from a target value and a detection value of the DC intermediate voltage so that the DC intermediate voltage is to be constant during speed reduction of the AC motor, a step of calculating a speed reduction rate 2 from the change ratio of the DC intermediate voltage, a step of calculating a torque instruction so that speed reduction follows the speed reduction time, a step of changing the torque limit value of the motor side and the regenerative side according to the DC intermediate voltage detection value, a step of terminating the speed reduction when voltage returns to the voltage before the power supply stop detection or the DC intermediate voltage increases during speed reduction, and a step of storing the output frequency before the power supply stop detection when returning to the normal control.

20 Claims, 8 Drawing Sheets

U.S. PATENT DOCUMENTS

| | | | |
|---|---|---|---|
| 6,762,947 B2* | 7/2004 | Hammond | 363/35 |
| 6,815,924 B1* | 11/2004 | Iura et al. | 318/727 |
| 6,924,618 B2* | 8/2005 | Matsushiro et al. | 318/811 |
| 7,005,825 B2* | 2/2006 | Eguchi | 318/727 |
| 7,042,181 B2* | 5/2006 | Nagakura | 318/434 |
| 7,091,690 B1* | 8/2006 | Oka et al. | 318/727 |
| 7,227,330 B2* | 6/2007 | Swamy et al. | 318/798 |
| 2007/0029963 A1* | 2/2007 | Iura et al. | 318/811 |

FOREIGN PATENT DOCUMENTS

| | | |
|---|---|---|
| JP | 60005791 A * | 1/1985 |
| JP | 8-242594 A | 9/1996 |
| JP | 9-247990 A | 9/1997 |
| JP | 11-150998 A | 6/1999 |
| JP | 11-308894 A | 11/1999 |
| JP | 2003-219689 A | 7/2003 |

* cited by examiner

AC MOTOR CONTROL METHOD AND CONTROL DEVICE

TECHNICAL FIELD

The present invention relates to a method of controlling an alternating current motor and a control device therefore capable of continuously driving the alternating current motor at the time of an instantaneous power failure.

BACKGROUND ART

As an example of a conventional method of continuously driving an alternating current motor by using an inverter at the time of an instantaneous power failure, Japanese Patent No. 3201460 (Patent Document 1) discloses the following method: an inverter starts decelerating an alternating motor in response to a power failure detecting signal; a first reduction rate is calculated on the basis of a target value and a detection value of a direct current intermediate voltage such that the direct current intermediate voltage is made constant during the deceleration; a second reduction rate is calculated on the basis of a variation in the direct current intermediate voltage; a value obtained by multiplying the two reduction rates together is controlled in a PI control manner to control a deceleration time; and when the direct current intermediate voltage is equal to a voltage before the power failure is detected or the direct current intermediate voltage rises during the deceleration, the deceleration stops and the alternating current motor is returned to a normal control mode.

Further, as an example of a method of processing a motor at the time of a power failure, JP-A-11-208894 (Patent Document 2) discloses the following method: a lower limit voltage $V_{U1}$ of a direct current intermediate voltage required for a normal driving mode, a lower allowable voltage $V_{U0}$ of the direct current intermediate voltage when a lowest voltage of a power supply is input, and a power failure detecting level voltage $V_{U2}$ which is lower than the lower allowable voltage $V_{U0}$ and is higher than the lower limit voltage $V_{U1}$ are set; when a detection value $V_{PN}$ of the direct current intermediate voltage output from a direct current intermediate voltage detecting circuit is lower than the power failure detecting level voltage $V_{U2}$ during the driving of the alternating current motor, an alternating current motor is decelerated at a reduction rate $\alpha_d$ until the direct current intermediate voltage is higher than the lower allowable voltage $V_{U0}$; and when the direct current intermediate voltage is higher than the lower allowable voltage $V_{U0}$, the alternating current motor is returned to a normal control mode.

Patent Document 1: Japanese Patent No. 3201460
Patent Document 2: JP-A-11-308894

PROBLEMS TO BE SOLVED BY THE INVENTION

In the method of continuously driving the alternating current motor by using the inverter at the time of a power failure disclosed in the above-mentioned Patent Document 1, the first reduction rate is calculated on the basis of the target value and the detection value of the direct current intermediate voltage, and the second reduction rate is calculated on the basis of the variation in the direct current intermediate voltage. Then, the value obtained by multiplying the two reduction rates together is controlled in the PI control manner to control the deceleration time. When the direct current intermediate voltage is equal to the voltage before the power failure is detected or the direct current intermediate voltage rises during the deceleration, the deceleration stops, and the alternating current motor is returned to the normal control mode.

However, in this method, when the alternating current motor is returned to the normal control mode, a large difference occurs between an output frequency before the power failure and an output frequency during the deceleration due to the power failure, causing the alternating current motor to be rapidly accelerated so as to coincide with an output frequency instruction or a large torque instruction to be outputted, which makes it difficult to stably and continuously drive the alternating current motor.

Meanwhile, in the method of processing the motor at the time of a power failure disclosed in Patent Document 2, when the detection value $V_{PN}$ of the direct current intermediate voltage is lower than the power failure detecting level voltage $V_{U2}$, the alternating current motor is decelerated at the reduction rate $\alpha_d$ until the direct current intermediate voltage is higher than the lower allowable voltage $V_{U0}$. In addition, when the direct current intermediate voltage is higher than the lower allowable voltage $V_{U0}$, the alternating current motor is returned to the normal control mode. When the alternating current motor is returned to the normal control mode, a large difference occurs between an output frequency before the power failure and an output frequency during the deceleration due to the power failure, causing the alternating current motor to be rapidly accelerated so as to coincide with an output frequency instruction or a large torque instruction to be outputted, which makes it difficult to stably and continuously drive the alternating current motor.

Accordingly, the invention is made in view of the above-mentioned problems, and it is an object of the invention to a method of controlling an alternating current motor and a control device therefor capable of stably and continuously driving the alternating current motor at the time of an instantaneous power failure, by storing an output frequency when the instantaneous power failure occurs and by accelerating the alternating current motor for an acceleration time separately set at a direct current intermediate voltage where the alternating current motor can return to a normal control mode until the output frequency of the alternating current motor is equal to an output frequency before the instantaneous power failure, or by restricting a torque instruction with an electromotive torque limit value until the output frequency of the alternating current motor is equal to the output frequency before the instantaneous power failure.

MEANS FOR SOLVING THE PROBLEMS

In order to achieve the above-mentioned object, according to an aspect of the invention disclosed in claim 1, there is provided a method of controlling an alternating current motor and a power converter including a converter unit for converting an alternating current voltage supplied from an alternating current power supply into a direct current voltage, a smoothing capacitor for smoothing the converted direct current voltage, and an inverter unit for converting a direct current intermediate voltage into an alternating current voltage having a frequency corresponding to a torque instruction by a PWM control manner, by setting an electromotive torque limit value and a regenerative torque limit value in advance and by restricting the torque instruction with the torque limit values to generate a PWM switching pattern to be output to the inverter unit. The method includes the steps of: allowing a power failure detecting unit provided in the power converter to detect a power failure of the alternating current power source; outputting a deceleration start instruction to the inverter unit in response to a power failure detecting signal output from the power failure detecting unit; calculating a first reduction rate, on the basis of a detection value and a target value of the direct current intermediate voltage, such that the direct current intermediate voltage is made constant during the deceleration of the alternating current motor; calculating a second reduction rate on the basis of a variation in the direct current intermediate voltage; controlling a deceleration time by controlling a value obtained by multiplying the two reduction rates together in a PI control manner; calculating the torque instruction to allow the alternating current motor to be decelerated for the deceleration time; changing the electromotive torque limit value and the regenerative torque limit value on the basis of the value of the detected direct current intermediate voltage; stopping the deceleration when the direct current intermediate voltage is equal to a voltage before the power failure is detected or it rises during the deceleration; and when the alternating current motor is returned to a normal control mode, storing an output frequency before the power failure is detected.

According to the method of controlling an alternating current motor described in claim 2, preferably, when the direct current intermediate voltage is equal to the voltage before the power failure is detected or it rises during the deceleration, the deceleration stops. In addition, preferably, when the alternating current motor is returned to the normal control mode, the alternating motor is accelerated for an arbitrary acceleration time until its output frequency is equal to the output frequency stored before the power failure is detected.

According to the method of controlling an alternating current motor described in claim 3, preferably, when the direct current intermediate voltage is equal to the voltage before the power failure is detected or it rises during the deceleration, the deceleration stops. In addition, preferably, when the alternating current motor is returned to the normal control mode, a torque limit unit restricts the torque instruction with an arbitrary electromotive torque limit value until the output frequency of the alternating current motor is equal to the output frequency stored before the power failure is detected.

According to another aspect of the invention described in claim 4, there is provided a control device which controls an alternating current motor and a power converter including a converter unit for converting an alternating current voltage supplied from an alternating current power supply into a direct current voltage, a smoothing capacitor for smoothing the converted direct current voltage, and an inverter unit for converting a direct current intermediate voltage into an alternating current voltage having a frequency corresponding to a torque instruction by a PWM control manner, by setting an electromotive torque limit value and a regenerative torque limit value in advance and by restricting the torque instruction with the torque limit values to generate a PWM switching pattern to be output to the inverter unit. The control device includes: a power failure detecting unit which detects a power failure of the alternating current power source; a unit which outputs a deceleration start instruction to the inverter unit in response to a power failure detecting signal output from the power failure detecting unit, calculates a first reduction rate, on the basis of a detection value and a target value of the direct current intermediate voltage, such that the direct current intermediate voltage is made constant during the deceleration of the alternating current motor, and calculates a second reduction rate on the basis of a variation in the direct current intermediate voltage; a unit which controls a deceleration time by controlling a value obtained by multiplying the two reduction rates together in a PI control manner; a unit which calculates the torque instruction to allow the alternating current motor to be decelerated for the deceleration time and changes the electromotive torque limit value and the regenerative torque limit value on the basis of the value of the detected direct current intermediate voltage; a unit which stops deceleration when the direct current intermediate voltage is equal to a voltage before the power failure is detected or it rises during the deceleration; and a unit which stores an output frequency before the power failure is detected when the alternating current motor is returned to a normal control mode.

According to the control device for an alternating current motor described in claim 5, preferably, when the direct current intermediate voltage is equal to the voltage before the power failure is detected or it rises during the deceleration, the deceleration stops. In addition, preferably, when the alternating current motor is returned to the normal control mode, the alternating motor is accelerated for an arbitrary acceleration time until its output frequency is equal to the output frequency stored before the power failure is detected.

According to the control device for an alternating current motor described in claim 6, preferably, when the direct current intermediate voltage is equal to the voltage before the power failure is detected or it rises during the deceleration, the deceleration stops. In addition, preferably, when the alternating current motor is returned to the normal control mode, the torque limit unit restricts the torque instruction with an arbitrary electromotive torque limit value until the output frequency of the alternating current motor is equal to the output frequency stored before the power failure is detected.

According to yet another aspect of the invention described in claim 7, there is provided a method of controlling an alternating current motor and a power converter including a converter unit for converting an alternating current voltage supplied from an alternating current power supply into a direct current voltage, a smoothing capacitor for smoothing the converted direct current voltage, and an inverter unit for converting a direct current intermediate voltage into an alternating current voltage having a frequency corresponding to a torque instruction by a PWM control manner. The method includes the steps of: setting an electromotive torque limit value and a regenerative torque limit value in advance; restricting the torque instruction with the torque limit values to generate a PWM switching pattern to be output to the inverter unit; setting a lower limit voltage $V_{U1}$ of the direct current intermediate voltage required for a normal driving mode, a lower allowable voltage $V_{U0}$ of the direct current intermediate voltage when a lowest voltage of a power supply is input, and a power failure detecting level voltage $V_{U2}$ which is lower than the lower allowable voltage $V_{U0}$ and is higher than the lower limit voltage $V_{U1}$; when a detection value of the direct current intermediate voltage output from a direct current intermediate voltage detecting circuit is lower than the power failure detecting level voltage $V_{U2}$ during the driving of the alternating current motor, decelerating the alternating current motor at a reduction rate $\alpha_d$ until the direct current intermediate voltage is higher than the lower allowable voltage $V_{U0}$; when the direct current intermediate voltage is higher than the lower allowable voltage $V_{U0}$, returning the alternating current motor to a normal control mode; and when the direct current intermediate voltage is higher than the lower allowable voltage $V_{U0}$ to cause the alternating current motor to be returned to the normal control mode, storing an output frequency before the power failure is detected.

According to the method of controlling an alternating current motor described in claim 8, preferably, when the direct current intermediate voltage is higher than the lower allowable voltage $V_{U0}$ to cause the alternating current motor to be returned to the normal control mode, the alternating current motor is accelerated for an arbitrary acceleration time until its output frequency is equal to the output frequency stored before the power failure is detected.

According to the method of controlling an alternating current motor described in claim 9, preferably, when the direct current intermediate voltage is higher than the lower allowable voltage $V_{U0}$ to cause the alternating current motor to be returned to the normal control mode, a torque limit unit restricts the torque instruction with an arbitrary electromotive torque limit value until the output frequency of the alternating current motor is equal to the output frequency stored before the power failure is detected.

According to still another aspect of the invention described in claim 10, there is provided a control device which controls an alternating current motor and a power converter including a converter unit for converting an alternating current voltage supplied from an alternating current power supply into a direct current voltage, a smoothing capacitor for smoothing the converted direct current voltage, and an inverter unit for converting a direct current intermediate voltage into an alternating current voltage having a frequency corresponding to a torque instruction by a PWM control manner. The control device controls the alternating current motor in the following sequence of: setting an electromotive torque limit value and a regenerative torque limit value in advance; restricting the torque instruction with the torque limit values to generate a PWM switching pattern to be output to the inverter unit; setting a lower limit voltage $V_{U1}$ of the direct current intermediate voltage required for a normal driving mode, a lower allowable voltage $V_{U0}$ of the direct current intermediate voltage when a lowest voltage of a power supply is input, and a power failure detecting level voltage $V_{U2}$ which is lower than the lower allowable voltage $V_{U0}$ and is higher than the lower limit voltage $V_{U1}$; when a detection value of the direct current intermediate voltage output from a direct current intermediate voltage detecting circuit is lower than the power failure detecting level voltage $V_{U2}$ during the driving of the alternating current motor, decelerating the alternating current motor at a reduction rate $\alpha_d$ until the direct current intermediate voltage is higher than the lower allowable voltage $V_{U0}$; when the direct current intermediate voltage is higher than the lower allowable voltage $V_{U0}$, returning the alternating current motor to a normal control mode; and when the direct current intermediate voltage is higher than the lower allowable voltage $V_{U0}$ to cause the alternating current motor to be returned to the normal control mode, storing an output frequency before the power failure is detected.

According to the control device for an alternating current motor described in claim 11, preferably, when the direct current intermediate voltage is higher than the lower allowable voltage $V_{U0}$ to cause the alternating current motor to be returned to the normal control mode, the alternating current motor is accelerated for an arbitrary acceleration time until its output frequency is equal to the output frequency stored before the power failure is detected.

According to the control device for an alternating current motor described in claim 12, preferably, when the direct current intermediate voltage is higher than the lower allowable voltage $V_{U0}$ to cause the alternating current motor to be returned to the normal control mode, a torque limit unit restricts the torque instruction with an arbitrary electromotive torque limit value until the output frequency of the alternating current motor is equal to the output frequency stored before the power failure is detected.

According to still yet another aspect of the invention described in claim 13, a method of controlling an alternating current motor includes the steps of: providing a power failure detecting unit for detecting a power failure of the alternating current motor in a power converter; outputting a deceleration start instruction to an inverter unit in response to a power failure detecting signal output from the power failure detecting unit; calculating a first reduction rate, on the basis of a detection value and a target value of a direct current intermediate voltage, such that a direct current intermediate voltage is made constant during the deceleration of the alternating current motor; calculating a second reduction rate on the basis of a variation in the direct current intermediate voltage; controlling a deceleration time by controlling a value obtained by multiplying the two reduction rates together in a PI control manner; when the direct current intermediate voltage is equal to a voltage before the power failure is detected or it rises during the deceleration, stopping the deceleration and returning the alternating current motor to a normal control mode; and when the direct current intermediate voltage is equal to the voltage before the power failure is detected or it rises during the deceleration to cause the deceleration to stop and the alternating current motor to be returned to the normal control mode, storing an output frequency before the power failure is detected.

According to the method of controlling an alternating current motor described in claim 14, preferably, when the direct current intermediate voltage is equal to the voltage before the power failure is detected or it rises during the deceleration to cause the deceleration to stop and the alternating current motor to be returned to the normal control mode, the alternating current motor is accelerated for an arbitrary acceleration time until its output frequency is equal to the output frequency stored before the power failure is detected.

According to yet still another aspect of the invention described in claim 15, there is provided a control device which controls an alternating current motor. The control device includes: a power converter; and a power failure detecting unit which detects a power failure of the alternating current motor and is provided in the power converter. In the control device, a deceleration start instruction is output to an inverter unit in response to a power failure detecting signal output from the power failure detecting unit. A first reduction rate is calculated, on the basis of a detection value and a target value of a direct current intermediate voltage, such that a direct current intermediate voltage is made constant during the deceleration of the alternating current motor. A second reduction rate is calculated on the basis of a variation in the direct current intermediate voltage. A value obtained by multiplying the two reduction rates together is controlled in a PI control manner to control a deceleration time. When the direct current intermediate voltage is equal to a voltage before the power failure is detected or it rises during the deceleration, a torque instruction is calculated to allow deceleration to stop and the alternating current motor to be decelerated for the deceleration time, thereby returning the alternating current motor to a normal control mode. An electromotive torque limit value and a regenerative torque limit value are changed on the basis of the value of the detected direct current intermediate voltage. A torque limit unit restricts the torque instruction. When the direct current intermediate voltage is equal to a voltage before the power failure is detected or it rises during the deceleration to cause the deceleration to stop and the alternating current motor to be returned to the normal control mode, an output frequency before the power failure is detected is stored.

According to the method of controlling an alternating current motor described in claim 16, preferably, when the direct current intermediate voltage is equal to the voltage before the power failure is detected or it rises during the deceleration to cause the deceleration to stop and the alternating current motor to be returned to the normal control mode, the alternating current motor is accelerated for an arbitrary acceleration time until its output frequency is equal to the output frequency stored before the power failure is detected.

According to still yet another aspect of the invention described in claim 17, a method of controlling an alternating current motor includes the steps of: setting a lower limit voltage $V_{U1}$ of a direct current intermediate voltage required for a normal driving mode, a lower allowable voltage $V_{U0}$ of the direct current intermediate voltage when a lowest voltage of a power supply is input, and a power failure detecting level voltage $V_{U2}$ which is lower than the lower allowable voltage $V_{U0}$ and is higher than the lower limit voltage $V_{U1}$; when a detection value of the direct current intermediate voltage output from a direct current intermediate voltage detecting circuit is lower than the power failure detecting level voltage $V_{U2}$ during the driving of the alternating current motor, decelerating the alternating current motor at a reduction rate $\alpha_d$ until the direct current intermediate voltage is higher than the lower allowable voltage $V_{U0}$; when the direct current intermediate voltage is higher than the lower allowable voltage $V_{U0}$, returning the alternating current motor to a normal control mode; and when the direct current intermediate voltage is higher than the lower allowable voltage $V_{U0}$ to cause the alternating current motor to be returned to the normal control mode, storing an output frequency before the power failure is detected.

According to the method of controlling an alternating current motor described in claim 18, preferably, when the direct current intermediate voltage is higher than the lower allowable voltage $V_{U0}$ to cause the alternating current motor to be returned to the normal control mode, the alternating current motor is accelerated for an arbitrary acceleration time until its output frequency is equal to the output frequency stored before the power failure is detected.

According to yet still another aspect of the invention described in claim 19, a control device for an alternating current motor includes a sequence unit which performs the functions of: setting a lower limit voltage $V_{U1}$ of a direct current intermediate voltage required for a normal driving mode, a lower allowable-voltage $V_{U0}$ of the direct current intermediate voltage when a lowest voltage of a power supply is input, and a power failure detecting level voltage $V_{U2}$ which is lower than the lower allowable voltage $V_{U0}$ and is higher than the lower limit voltage $V_{U}$; when a detection value of the direct current intermediate voltage output from a direct current intermediate voltage detecting circuit is lower than the power failure detecting level voltage $V_{U2}$ during the driving of the alternating current motor, decelerating the alternating current motor at a reduction rate $\alpha_d$ until the direct current intermediate voltage is higher than the lower allowable voltage $V_{U0}$; and when the direct current intermediate voltage is higher than the lower allowable voltage $V_{U0}$, returning the alternating current motor to a normal control mode. In the control device, when the direct current intermediate voltage is higher than the lower allowable voltage $V_{U0}$ to cause the alternating current motor to be returned to the normal control mode, an output frequency before the power failure is detected is stored.

According to the control device for an alternating current motor described in claim 20, preferably, when the direct current intermediate voltage is higher than the lower allowable voltage $V_{U0}$ to cause the alternating current motor to be returned to the normal control mode, the alternating current motor is accelerated for an arbitrary acceleration time until its output frequency is equal to the output frequency stored before the power failure is detected.

EFFECTS OF THE INVENTION

According to a method of controlling an alternating current motor and a control method therefor of the invention, it is possible to make a direct current intermediate voltage constant and thus to stably and continuously drive the alternating current motor even at the time of an instantaneous power failure, without using a regenerative resistor or an apparatus for feeding back regenerative energy to a power supply, by setting an electromotive torque limit value and a regenerative torque limit value to restrict a torque instruction.

BRIEF DESCRIPTION OF THE DRAWINGS

FIG. 1 is a block diagram illustrating the structure of a control device for an alternating current motor according to a first embodiment of the invention.

FIG. 2 is a diagram illustrating the relationship between a direct current intermediate voltage $V_{PN}$ and electromotive and regenerative torque limit values according to the invention.

FIG. 3 is a diagram illustrating the relationship between a direct current intermediate voltage $V_{PN}$ and electromotive and regenerative torque limit values according to a second embodiment of the invention.

FIG. 4 is a block diagram illustrating the structure of a control device for an alternating current motor according to a third embodiment of the invention.

FIG. 5 is a block diagram illustrating a sequence circuit for selecting a frequency instruction and an acceleration/deceleration time during the detection of a power failure according to the third embodiment.

FIG. 6 is a block diagram illustrating the structure of a control device for an alternating current motor according to a fourth embodiment of the invention.

FIG. 7 is a diagram illustrating the relationship between a direct current intermediate voltage $V_{PN}$ and electromotive and regenerative torque limit values according to the fourth embodiment of the invention.

FIG. 8 is a block diagram illustrating the structure of a control device for an alternating current motor according to a sixth embodiment of the invention.

FIG. 9 is a block diagram illustrating a sequence circuit for selecting an electromotive torque limit value, a frequency instruction, and an acceleration/deceleration time during the detection of a power failure according to the sixth embodiment.

REFERENCE NUMERALS

1: POWER CONVERTER
11: CONVERTER UNIT
12: SMOOTHING CAPACITOR
13: INVERTER UNIT
2: ALTERNATING CURRENT MOTOR
3: TORQUE LIMIT CIRCUIT
4: VOLTAGE INSTRUCTION CALCULATING UNIT
5: SWITCHING PATTERN GENERATING CIRCUIT
6: VOLTAGE DETECTING CIRCUIT
7: TORQUE LIMIT VALUE CALCULATING CIRCUIT
8: ELECTROMAGNETIC CONTACTOR
8a: POWER FAILURE DETECTING CONTACT
9: FREQUENCY SETTING UNIT
10: ACCELERATION/DECELERATION TIME SETTING UNIT
14: SEQUENCE CIRCUIT
15: ACCELERATION/DECELERATION TIME CONTROL CIRCUIT
16: SOFT STARTER
17: SPEED CONTROL CIRCUIT
18: FIRST SWITCHING UNIT
19: SECOND SWITCHING UNIT
20: THIRD SWITCHING UNIT
21: OUTPUT FREQUENCY STORAGE CIRCUIT BEFORE POWER FAILURE
22: EDGE TRIGGER DETECTING CIRCUIT
23, 24: OR CIRCUIT
25, 26: COMPARATOR

BEST MODE FOR CARRYING OUT THE INVENTION

Hereinafter, preferred embodiments of the invention will be described below with reference to the accompanying drawings.

First Embodiment

Figure 1:
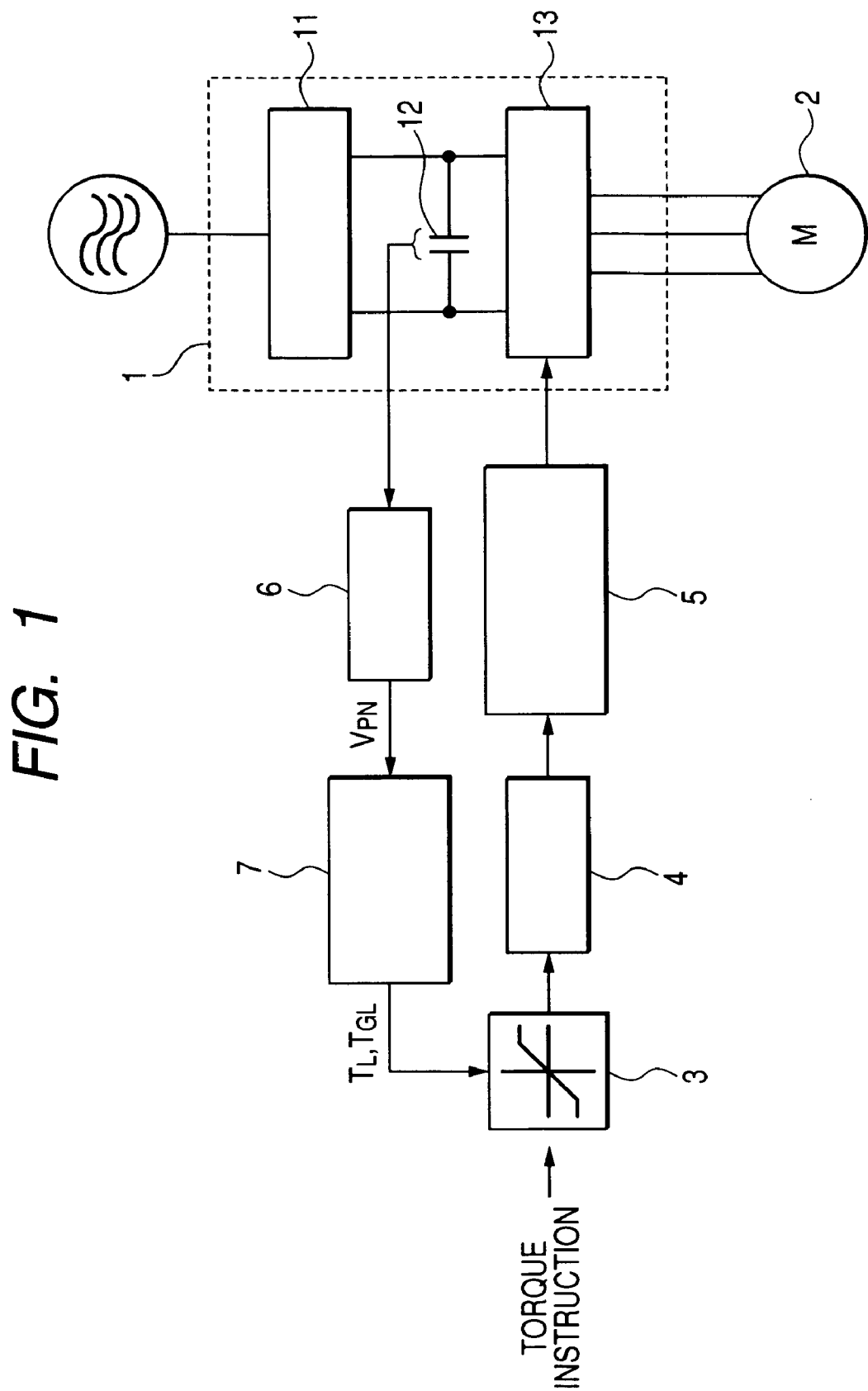
[FIG. 1]
Figure 2:
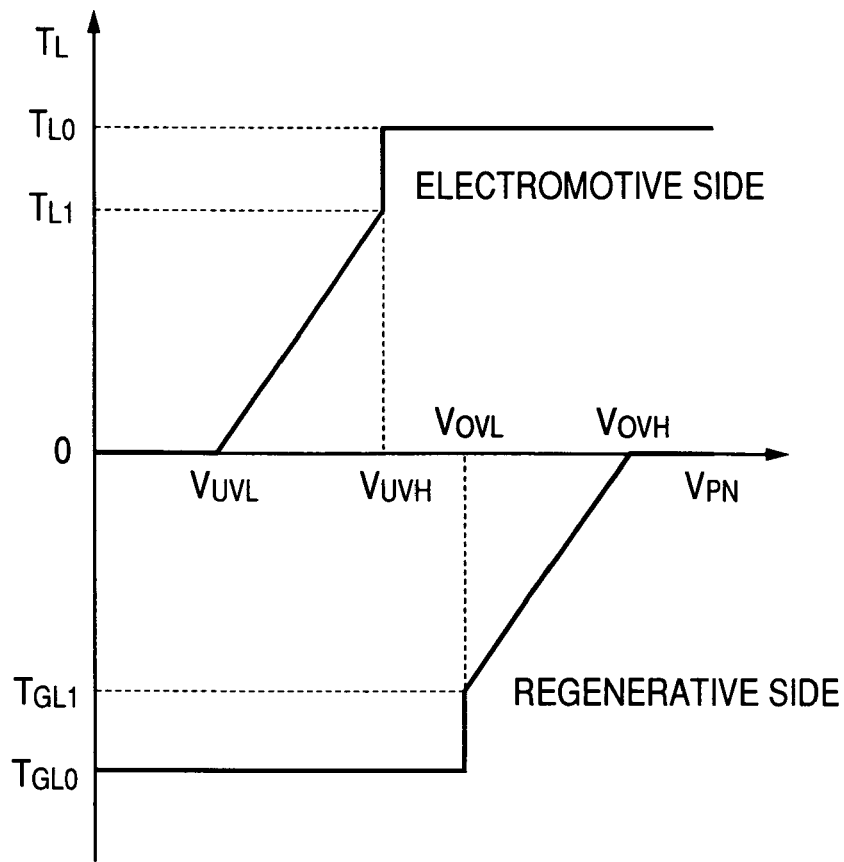
[FIG. 2]

FIG. 1 is a block diagram illustrating the structure of a control device for an alternating current (AC) motor according to a first embodiment of the invention. FIG. 2 is a diagram illustrating the relationship between a DC intermediate voltage and a torque limit value of a torque limit circuit in this embodiment.

The control device for the AC motor according to this embodiment includes: a power converter 1 having a converter unit 11 for converting a three-phase alternating current supplied from a three-phase alternating current power supply into a DC voltage by using a power element, a smoothing capacitor 12 for smoothing the converted voltage, and an inverter unit 13 for converting the DC intermediate voltage into an AC voltage having a predetermined frequency by a PWM control manner; an AC motor 2 which is driven by an alternating current output from the inverter unit 13; a torque limit circuit 3 for controlling a torque instruction so as to be between a predetermined electromotive torque limit value and a predetermined regenerative torque limit value; a voltage instruction calculating unit 4 for calculating a voltage instruction allowing a torque to be output according to the torque instruction output from the torque limit circuit 3 and for outputting the voltage instruction; a switching pattern generating circuit 5 for determining a switching pattern of the power converter 1 on the basis of the output of the voltage instruction calculating unit 4; a voltage detecting circuit 6 for detecting a DC intermediate voltage $V_{PN}$, which is a voltage of the smoothing capacitor 12; a torque limit value calculating circuit 7 for calculating an electromotive torque limit value $T_L$ and a regenerative torque limit value $T_{GL}$, on the basis of the DC intermediate voltage $V_{PN}$ output from the voltage detecting circuit 6 and for setting the calculated values to the torque limit circuit 3.

In general, torque output by the AC motor 2 is controlled by a machine connected to the AC motor 2, the AC motor 2, or the power converter 1, in response to a predetermined torque instruction. Therefore, an electromotive torque limit value $T_{L0}$ and a regenerative torque limit value $T_{GL0}$ are set in advance. Thus, the AC motor 2 is controlled within the torque limit.

However, when the AC motor 2 is rapidly decelerated or when an output frequency is raised by a gravity load or a mechanical load, the AC motor 2 generates a regenerative torque, and regenerative energy is fed back to the AC motor 2, causing the DC intermediate voltage $V_{PN}$ to rise. When the DC intermediate voltage $V_{PN}$ is higher than a predetermined level, the AC motor may be non-controllable, or a circuit may be broken. Therefore, it is necessary to control the DC intermediate voltage $V_{PN}$ so as not to rise beyond the predetermined level.

Therefore, in general, a resistor is connected in parallel to the smoothing capacitor 12 to provide a regenerative resistor for consuming power, or an apparatus for feeding back regenerative energy to a power supply is used. However, in the invention, the rise of the DC intermediate voltage $V_{PN}$ is controlled without using the regenerative resistor or the apparatus for feeding back the regenerative energy to the power supply. In addition, the electromotive torque limit value and the regenerative torque limit value are changed according to the level of the DC intermediate voltage $V_{PN}$ such that the AC motor is continuously driven when the DC intermediate voltage $V_{PN}$ is lowered due to, for example, an instantaneous power failure.

More specifically, as an example of a method of setting the torque limit value, the relationship between the DC intermediate voltage $V_{PN}$ and the torque limit value is defined as shown in FIG. 2, and the electromotive torque limit value and the regenerative torque limit value are controlled according to the level of the DC intermediate voltage $V_{PN}$.

When the DC intermediate voltage $V_{PN}$ is higher than a voltage $V_{UVH}$, the electromotive torque limit value is set to a predetermined electromotive torque limit value $T_{L0}$. On the other hand, when the DC intermediate voltage $V_{PN}$ is lower than a voltage $V_{UVL}$, the electromotive torque limit value is set to zero so as not to generate electromotive torque. When the DC intermediate voltage $V_{PN}$ is higher than the voltage $V_{UVL}$ and lower than the voltage $V_{UVH}$, the electromotive torque limit value rises from zero to a predetermined torque limit value $T_{L1}$ in proportion to the DC intermediate voltage $V_{PN}$. In general, the range of the electromotive torque limit value is gradually narrowed, as the DC intermediate voltage $V_{PN}$ becomes lower than the voltage $V_{UVH}$. Therefore, this setting prevents the DC intermediate voltage from being further lowered due to the lowering of the DC intermediate voltage $V_{PN}$. Thus, the DC intermediate voltage $V_{PN}$ is not sharply lowered, which makes it possible to continuously drive the AC motor.

Meanwhile, when the DC intermediate voltage $V_{PN}$ is lower than a voltage $V_{OVL}$, the regenerative torque limit value turns to a predetermined regenerative torque limit value $T_{GL0}$. On the other hand, when the DC intermediate voltage $V_{PN}$ is higher than a voltage $V_{OVH}$, the regenerative torque limit value is set to zero so as not to generate regenerative torque. Between the voltage $V_{OVL}$ and the voltage $V_{OVH}$, the regenerative torque limit value is lowered from a predetermined torque limit value $T_{GL1}$ to zero in proportion to the DC intermediate voltage $V_{PN}$. In general, the range of the regenerative torque limit value is gradually narrowed, as the DC intermediate voltage $V_{PN}$ becomes higher than the voltage $V_{OVL}$. Therefore, this setting prevents the DC intermediate voltage from being further raised due to a rise in the DC intermediate voltage $V_{PN}$. Thus, the DC intermediate voltage $V_{PN}$ does not sharply rise, which makes it possible to continuously drive the AC motor.

In this way, it is possible to control the DC intermediate voltage to be constant at the time of an instantaneous power failure and thus to continuously drive the AC motor smoothly.

Further, when the DC intermediate voltage $V_{PN}$ is lower than the voltage $V_{OVL}$ during rapid deceleration, the AC motor is decelerated at a reduction rate $\alpha_d$ in the response to a rapid deceleration instruction. On the other hand, when the DC intermediate voltage $V_{PN}$ is higher than the voltage $V_{OVL}$, the range of the regenerative torque limit value becomes narrower as the DC intermediate voltage becomes higher. Therefore, the reduction rate $\alpha_d$ is gradually lowered to cause the AC motor to be decelerated at a regenerative level which can be absorbed by the power converter. As a result, the AC motor can be smoothly decelerated.

Furthermore, in a structure in which a load side raises the speed of the AC motor, until the DC intermediate voltage $V_{PN}$ rises up to the voltage $V_{OVL}$, a regenerative torque is output so as to ensure speed accuracy, that is, speed control is performed. When the DC intermediate voltage $V_{PN}$ is higher than the voltage $V_{OVL}$, the range of the regenerative torque limit value is narrowed such that the DC intermediate voltage does not further rise. Then, the speed of the AC motor is lowered corresponding to the reduced value, reducing in the deterioration of speed accuracy. However, according to this embodiment, it is possible to prevent the DC intermediate voltage from being further raised and thus to smoothly and continuously drive the AC motor. When the DC intermediate voltage is lowered, the range of the regenerative torque limit value is immediately widened, and then the regenerative torque occurs, which makes it possible to make the speed of the AC motor constant.

In the above-mentioned structure in which the regenerative torque limit value is controlled according to the level of the DC intermediate voltage, when the rise of the DC intermediate voltage occurs in the power converter not including the regenerative resistor or the apparatus for feeding back the regenerative energy to the power supply, the speed accuracy is deteriorated, but an excessive rise in voltage does not occur, which makes it possible to smoothly and continuously drive the AC motor.

In this embodiment, FIG. 2 shows the relationship between the DC intermediate voltage and the electromotive and regenerative torque limit values. The electromotive torque limit values $T_{L1}$ and $T_{L0}$ may be equal to each other, or the regenerative torque limit values $T_{GL1}$ and $T_{GL0}$ may be equal to each other. In addition to the relationship in which the electromotive torque limit value and the regenerative torque limit value are proportional to the DC intermediate voltage, any relationship may be used as long as the following is satisfied: when the DC intermediate voltage becomes lower, the electromotive torque limit value approximates zero, and when the DC intermediate voltage becomes higher, the regenerative torque limit value approximates zero. Further, the following method is also preferable: from the relationship between the inertia of a machine or the capacitance of a smoothing capacitor and torque, the next level of the DC intermediate voltage is estimated to narrow the ranges of the electromotive and regenerative torque limit values.

Second Embodiment

A second embodiment of the invention using the control device for the AC motor shown in FIG. 2 will be described below. In this embodiment, the following method of controlling an AC motor is provided. A lower limit voltage $V_{U1}$ of the DC intermediate voltage $V_{PN}$ required to drive the AC motor 2, a lower limit allowable voltage $V_{U0}$ of the DC intermediate voltage $V_{PN}$ equal to a lower limit voltage of the power supply, and a power failure detecting level voltage $V_{U2}$ lower than the lower limit allowable voltage $V_{U0}$ and higher than the lower limit voltage $V_{U1}$ are set in advance. When the DC intermediate voltage $V_{PN}$ output from the DC intermediate voltage detecting circuit 6 is lower than the power failure detecting level voltage $V_{U2}$ during the driving of the AC motor, the AC motor is decelerated at a predetermined reduction rate $\alpha_d$ until the DC intermediate voltage $V_{PN}$ exceeds the lower limit allowable voltage $V_{U0}$. When the DC intermediate voltage $V_{PN}$ exceeds the lower limit allowable voltage $V_{U0}$, the alternating current motor is returned to a normal control mode.

Figure 3:
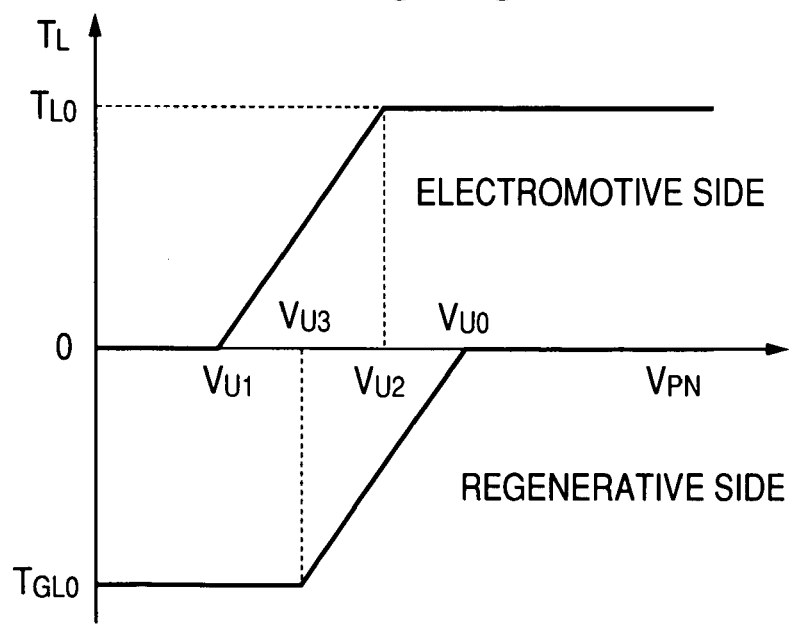
[FIG. 3]

More specifically, the relationship between the DC intermediate voltage $V_{PN}$ and a torque limit value shown in FIG. 3 is defined in the torque limit circuit 3. An electromotive torque limit value is set to zero when the DC intermediate voltage $V_{PN}$ is lower than the lower limit voltage $V_{U1}$. When the DC intermediate voltage $V_{PN}$ is between the lower limit voltage $V_{U1}$ and the lower limit allowable voltage $V_{U0}$, the electromotive torque limit value gradually increase from zero to a predetermined value. When the DC intermediate voltage $V_{PN}$ is higher than the lower limit allowable voltage $V_{U0}$, the electromotive torque limit value is set to a predetermined value. When the DC intermediate voltage $V_{PN}$ is lower than a low voltage level $V_{U3}$ between the power failure detecting level voltage $V_{U2}$ and the lower limit voltage $V_{U1}$, the regenerative torque limit value is set to a predetermined value. When the DC intermediate voltage $V_{PN}$ is between the low voltage level $V_{U3}$ and the lower limit allowable voltage $V_{U0}$, the regenerative torque limit value gradually decreases from the predetermined value to zero. When the DC intermediate voltage $V_{PN}$ is lower than the lower limit allowable voltage $V_{U0}$, the regenerative torque limit value is zero.

In this embodiment, control is performed at the time of power failure such that the electromotive and regenerative torque limit values are limited according to the level of the DC intermediate voltage $V_{PN}$, which makes it possible to control the DC intermediate voltage to be constant and thus to smoothly and continuously drive the AC motor.

In FIG. 3, the low voltage level $V_{U3}$ is set to an arbitrary value. However, the low voltage level $V_{U3}$ may be equal to the power failure detecting level voltage $V_{U2}$. In addition, the torque limit value varies in proportion to the DC intermediate voltage $V_{PN}$. However, an arbitrary relationship may be established therebetween.

In this embodiment, when the DC intermediate voltage $V_{PN}$ exceeds the lower limit allowable voltage $V_{U0}$, the alternating current motor is returned to a normal control mode. However, at the time of power failure, reduction control is performed such that the DC intermediate voltage $V_{PN}$ is made constant, causing the AC motor to be driven at an output frequency lower than the output frequency before the power failure. For this reason, the AC motor is rapidly accelerated in response to an output frequency instruction, a large torque instruction is output to make the power failure conditions again, or shock occurs due to a sharp variation in the speed of the AC motor, making it difficult to perform smooth and continuous driving. Therefore, according to this embodiment of the invention, the output frequency when the power failure is detected is stored in advance. When the DC intermediate voltage $V_{PN}$ exceeds the lower limit allowable voltage $V_{U0}$ to cause the alternating current motor to be returned to the normal control mode, the AC motor is accelerated for only a predetermined acceleration time until its output frequency is equal to the stored output frequency. Alternatively, the output frequency when the power failure is detected is stored in advance. When the DC intermediate voltage $V_{PN}$ exceeds the lower limit allowable voltage $V_{U0}$ to cause the alternating current motor to be returned to the normal control mode, a torque instruction is restricted by a predetermined electromotive torque limit value until the output frequency of the AC motor is equal to the stored output frequency, which prevents the AC motor from being rapidly accelerated.

In this way, even when a power failure is detected, it is possible to smoothly and continuously drive the AC motor.

Third Embodiment

Figure 4:
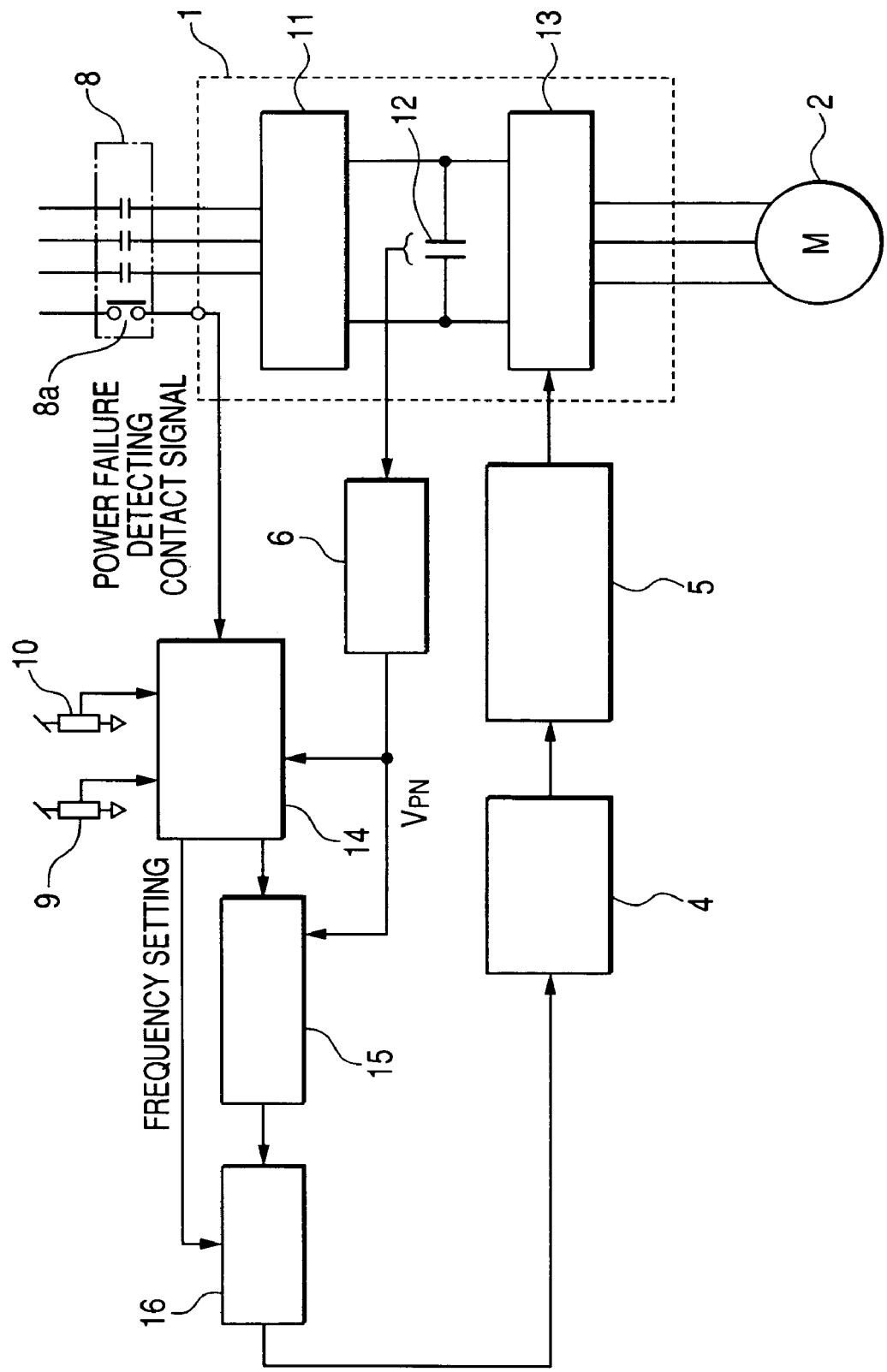
[FIG. 4]
Figure 5:
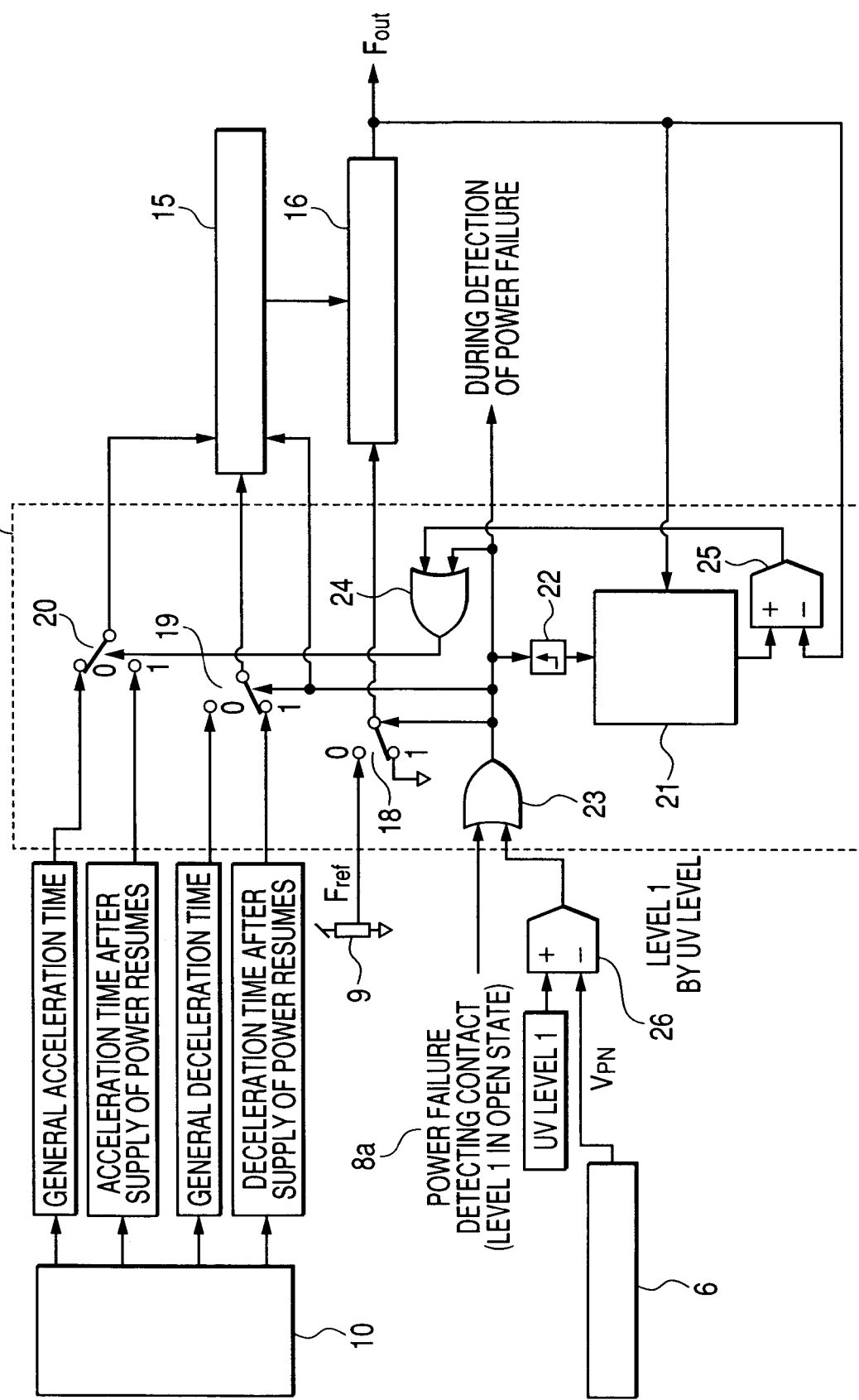
[FIG. 5]

FIG. 4 is a block diagram illustrating the structure of a control device for an AC motor according to a third embodiment of the invention. FIG. 5 is a block diagram illustrating a sequence circuit for selecting acceleration/deceleration time and a frequency instruction during the detection of a power failure.

In FIG. 4, the control device for the AC motor according to this embodiment includes: a power converter 1 having a converter unit 11 for converting a three-phase alternating current supplied from a three-phase alternating current power supply (not shown) through an electromagnetic contactor 8 into a DC voltage by using a power element, a smoothing capacitor 12 for smoothing the converted voltage, and an inverter unit 13 for converting a DC intermediate voltage into an AC voltage having a predetermined frequency by a PWM control manner; an AC motor 2 which is driven by an alternating current output from the inverter unit 13; a voltage instruction calculating unit 4 for calculating a voltage instruction on the basis of a frequency output from a soft starter; a switching pattern generating circuit 5 for determining a switching pattern of the power converter 1 on the basis of the output of the voltage instruction calculating unit 4; a voltage detecting circuit 6 for detecting a DC intermediate voltage $V_{PN}$, which is a voltage of the smoothing capacitor 12; a frequency setting unit 9 for setting an output frequency; an acceleration/deceleration time setting unit 10 for setting acceleration/deceleration time when the AC motor 2 is accelerated or decelerated from a stop state until the maximum output frequency is output; a sequence circuit 14 for detecting a power failure, on the basis of a power failure detecting signal from a power failure detecting contact 8a of the electromagnetic contactor 8, and for setting the frequency instruction and the deceleration time during the detection of the power failure; an acceleration/deceleration time control circuit 15 for controlling the deceleration time such that the DC intermediate voltage $V_{PN}$ is made constant by PI control during the detection of the power failure and for controlling the acceleration time after the supply of power resumes; and a soft starter 16 for raising or lowering the output frequency for a predetermined acceleration/deceleration time.

As shown in FIG. 5, in the sequence circuit 14, a first switching unit 18 performs switching between a general frequency instruction output from the frequency setting unit 9 and a frequency instruction output at the time of a power failure to output the frequency instruction to the soft starter 16, in response to a power failure detecting signal output based on a low voltage detection output signal output from the voltage detecting circuit 6 (which is output when the DC intermediate voltage $V_{PN}$ is lower than a set UV level of 1) or a power failure output signal output from the power failure detecting contact 8a of the electromagnetic contactor 8. A second switching unit 19 selects one of a general deceleration time output from the acceleration/deceleration time setting unit 10 and a deceleration time during the detection of a power failure and outputs the selected time to the acceleration/deceleration time control circuit 15. An edge trigger detecting circuit 22 detects a point of time when the power failure detecting signal turns from '0' to '1'. An output frequency storage circuit 21 before a power failure stores an output frequency when the edge trigger detecting circuit 22 detects the power failure. A third switching unit 20 selects one of a general acceleration time output from the acceleration/deceleration time setting unit 10 and an acceleration time after the supply of power resumes and outputs the selected time to the acceleration/deceleration time control circuit 15 when the power failure detecting signal is maintained at the level of '1' and until the output frequency output from the soft contactor is equal to the output frequency stored in the output frequency storage circuit 21 before the power failure when the power failure detecting signal is at the level of '0'. In FIG. 5, reference numerals 23 and 24 denote OR circuits, and reference numerals 25 and 26 indicate comparators.

Next, a description will be made below of a method of controlling continuous driving during the detection of a power failure in the control device for the AC motor according to this embodiment.

When an instantaneous power failure occurs in an AC power supply, the electromagnetic contactor 8 (FIG. 4) is opened, which causes the power failure detecting contact turns to '1' in level or the DC intermediate voltage of the smoothing capacitor 12 to be lower than a UV level $1V_{UV1}$. Then, the voltage detecting circuit 6 for detecting the DC intermediate voltage detects the power failure. When the power failure is detected, the power failure detecting contact signal turns to '1' in level, or the low voltage detecting signal is turned to '1' in level by the DC intermediate voltage $V_{PN}$ detected by the voltage detecting circuit 6, as shown in FIG. 5. Then, the signals are input to the sequence circuit 14. In the sequence circuit 14, when the power failure detecting contact signal is at the level of '1' or the low voltage detecting signal is at the level of '1', the power failure detecting signal turns to '1' in level. The frequency instruction is switched to 0 by the first and second switching units 18 and 19, so that the deceleration time is switched to the set deceleration time during the detection of a power failure, and the output frequency when the power failure is detected is stored in the output frequency storage circuit 12 before the power failure. When the power converter 1 for controlling the driving of the AC motor 2 is changed from a normal driving mode to a deceleration mode, rotational energy corresponding to the reduction rate of the AC motor is transformed into regenerative power by the inverter unit 13, and the smoothing capacitor 12 forming a DC intermediate circuit is charged, causing the terminal voltage thereof to rise.

When the power failure detecting signal turns to '1' in level, the acceleration/deceleration time control circuit 15 controls a reduction rate by a PI control manner, referring to the level of the DC intermediate voltage $V_{PN}$ and the variation of the DC intermediate voltage, such that the DC intermediate voltage $V_{PN}$ detected by the voltage detecting circuit 6 is equal to an input voltage set value×1.35. In this way, the rotational speed of the AC motor 2 is lowered not rapidly but slowly, which enables the motor to be continuously driven during the instantaneous power failure. When a rise in the DC intermediate voltage $V_{PN}$ is detected, or when the DC intermediate voltage $V_{PN}$ is higher than the voltage before the power failure is detected, deceleration stops. When the supply of power is resumed by the AC power supply of the inverter unit 13, the power failure detecting contact 8a of the electromagnetic contactor 8 is closed, and the DC intermediate voltage $V_{PN}$ is higher than the low voltage detecting level, so that the AC motor is returned to the normal driving mode. The AC motor is driven for the acceleration time from the acceleration/deceleration time setting unit 10 after the supply of power resumes, until the output frequency output from the soft starter is equal to the output frequency stored in the output frequency storage circuit 21 before the power failure. When the output frequency output from the soft starter is equal to the output frequency stored in the output frequency storage circuit 21 before the power failure, the AC motor is accelerated or decelerated for the acceleration/deceleration time generally set, until the output frequency thereof is equal to a frequency set value. In this way, it is possible to continuously drive an AC motor when a power failure is detected.

Fourth Embodiment

Figure 6:
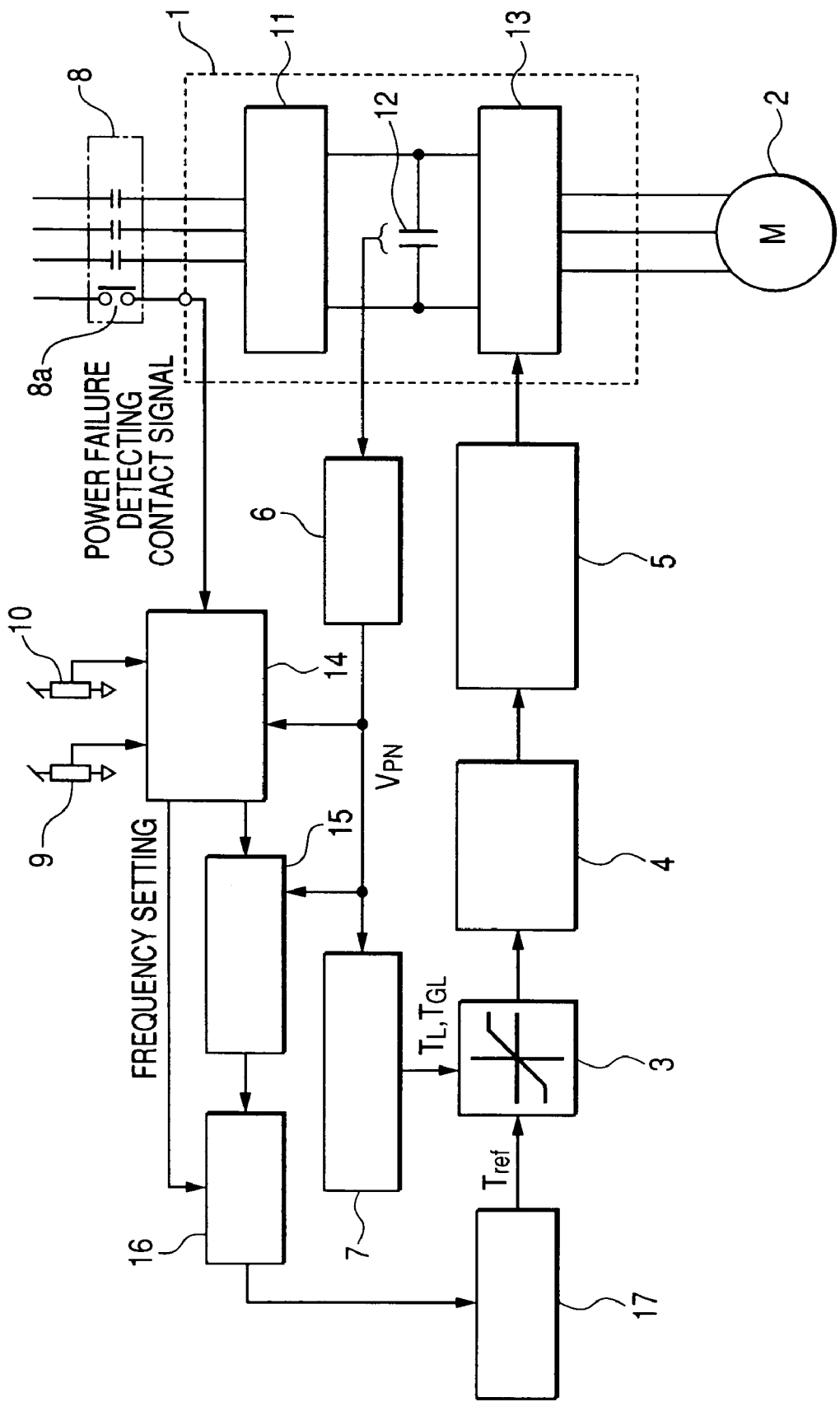
[FIG. 6]

FIG. 6 is a block diagram illustrating the structure of a control device for an AC motor according to a fourth embodiment of the invention.

In FIG. 6, the control device for the AC motor according to this embodiment includes: a power converter 1 having a converter unit 11 for converting a three-phase alternating current supplied from a three-phase alternating current power supply (not shown) through an electromagnetic contactor 8 into a DC voltage by using a power element, a smoothing capacitor 12 for smoothing the converted voltage, and an inverter unit 13 for converting a DC intermediate voltage into an AC voltage having a predetermined frequency by a PWM control manner; an AC motor 2 which is driven by an alternating current output from the inverter unit 13; a torque limit circuit 3 for controlling a torque instruction so as to be between a predetermined electromotive torque limit value and a predetermined regenerative torque limit value; a voltage instruction calculating unit 4 for calculating a voltage instruction allowing torque to be output according to the torque instruction output from the torque limit circuit 3 and for outputting the voltage instruction; a switching pattern generating circuit 5 for determining a switching pattern of the power converter 1 on the basis of the output of the voltage instruction calculating unit 4; a voltage detecting circuit 6 for detecting a DC intermediate voltage $V_{PN}$, which is a voltage of the smoothing capacitor 12; a torque limit value calculating circuit 7 for calculating an electromotive torque limit value $T_L$ and a regenerative torque limit value $T_{GL}$, on the basis of the DC intermediate voltage $V_{PN}$ output from the voltage detecting circuit 6 and for setting the calculated values to the torque limit circuit 3; a frequency setting unit 9 for setting an output frequency; an acceleration/deceleration time setting unit 10 for setting acceleration/deceleration time when the AC motor 2 is accelerated or decelerated from a stop state until the maximum output frequency is output; a sequence circuit 14 for detecting a power failure, on the basis of a power failure detecting signal from a power failure detecting contact 8a of the electromagnetic contactor 8, and for setting the frequency instruction and the deceleration time during the detection of the power failure; an acceleration/deceleration time control circuit 15 for controlling the deceleration time such that the DC intermediate voltage $V_{PN}$ is made constant by PI control during the detection of the power failure and for controlling the acceleration time after the supply of power resumes; a soft starter 16 for raising or lowering the output frequency for a predetermined acceleration/deceleration time; and a speed control circuit 17 for outputting a torque instruction on the basis of the frequency output from the soft starter 16.

FIG. 5 is a block diagram illustrating a sequence circuit according to the third embodiment for selecting acceleration/deceleration time and a frequency instruction during the detection of a power failure. In FIG. 5, reference numeral 20 denotes a third switching unit, and reference numeral 21 denotes an output frequency storage circuit before a power failure. Reference numeral 22 denotes an edge trigger detecting circuit, and reference numerals 23 and 24 denote OR circuits. Reference numerals 25 and 26 denote comparators.

As shown in FIG. 5, in the sequence circuit 14, a first switching unit 18 performs switching between a general frequency instruction output from the frequency setting unit 9 and a frequency instruction output at the time of a power failure to output the frequency instruction to the soft starter 16, on the basis of the power failure detecting signal output based on a low voltage detecting output signal output from the voltage detecting circuit 6 (which is output when the DC intermediate voltage $V_{PN}$ is lower than a set UV level of 1) or a power failure output signal output from the power failure detecting contact 8a of the electromagnetic contactor 8. A second switching unit 19 selects one of a general deceleration time output from the acceleration/deceleration time setting unit 10 and a deceleration time during the detection of a power failure and outputs the selected time to the acceleration/deceleration time control circuit 15. The edge trigger detecting circuit 22 detects a point of time when the power failure detecting signal turns from '0' to '1'. The output frequency storage circuit 21 before the power failure stores an output frequency when the edge trigger detecting circuit 22 detects the power failure. The third switching unit 20 selects one of a general acceleration time output from the acceleration/deceleration time setting unit 10 and an acceleration time after the supply of power resumes and outputs the selected time to the acceleration/deceleration time control circuit 15 when the power failure detecting signal is maintained at the level of '1' and until the output frequency output from the soft contactor is equal to the output frequency stored in the output frequency storage circuit 21 before the power failure when the power failure detecting signal is at the level of '0'.

Next, a description will be made below of a method of controlling continuous driving during the detection of a power failure in the control device for the AC motor according to this embodiment.

When an instantaneous power failure occurs in an AC power supply, the electromagnetic contactor 8 (FIG. 6) is opened, which causes the power failure detecting contact turns to '1' in level or the DC intermediate voltage of the smoothing capacitor 12 to be lower than a UV level $1V_{UV1}$. Then, the voltage detecting circuit 6 for detecting the DC intermediate voltage detects the power failure. When the power failure is detected, the power failure detecting contact signal turns to '1' in level, or the low voltage detecting signal is turned to '1' in level by the DC intermediate voltage $V_{PN}$ detected by the voltage detecting circuit 6, as shown in FIG. 5. Then, the signals are input to the sequence circuit 14. In the sequence circuit 14, when the power failure detecting contact signal is at the level of '1' or the low voltage detecting signal is at the level of '1', the power failure detecting signal turns to '1' in level. The frequency instruction is switched to 0 by the first and second switching units 18 and 19, so that the deceleration time is switched to the set deceleration time during the detection of a power failure, and the output frequency when the power failure is detected is stored in the output frequency storage circuit 12 before the power failure. When the power converter 1 for controlling the driving of the AC motor 2 is changed from a normal driving mode to a deceleration mode, rotational energy corresponding to the reduction rate of the AC motor is transformed into regenerative power by the inverter unit 13, and the smoothing capacitor 12 forming a DC intermediate circuit is charged, causing the terminal voltage thereof to rise.

When the power failure detecting signal turns to '1' in level, the acceleration/deceleration time control circuit 15 controls a reduction rate by a PI control manner, referring to the level of the DC intermediate voltage $V_{PN}$ and the variation of the DC intermediate voltage, such that the DC intermediate voltage $V_{PN}$ detected by the voltage detecting circuit 6 is equal to an input voltage set value×1.35. In this way, the rotational speed of the AC motor 2 is lowered not rapidly but slowly, which enables the motor to be continuously driven during the instantaneous power failure. When a rise in the DC intermediate voltage $V_{PN}$ is detected, or when the DC intermediate voltage $V_{PN}$ is higher than the voltage before the power failure is detected, deceleration stops. When the supply of power is resumed by the AC power supply of the inverter unit 13, the power failure detecting contact 8a of the electromagnetic contactor 8 is closed, and the DC intermediate voltage $V_{PN}$ is higher than the low voltage detecting level, so that the AC motor is returned to the normal driving mode. The AC motor is driven for the acceleration time from the acceleration/deceleration time setting unit 10 after the supply of power resumes, until the output frequency output from the soft starter is equal to the output frequency stored in the output frequency storage circuit 21 before the power failure. When the output frequency output from the soft starter is equal to the output frequency stored in the output frequency storage circuit 21 before the power failure, the AC motor is accelerated or decelerated for the acceleration/deceleration time generally set, until the output frequency thereof is equal to a frequency set value. In this way, it is possible to continuously drive an AC motor when a power failure is detected.

Fifth Embodiment

In a fifth embodiment, in addition to the function described in the fourth embodiment, the speed control circuit 17 for making a frequency $F_{out}$ output from the soft starter 16 shown in FIG. 6 equal to the speed of the AC motor 2 creates a torque instruction $T_{ref}$. When the AC motor 2 is controlled by the torque instruction, the DC intermediate voltage is oscillated due to the inertia of a load, a reduction rate coefficient of the acceleration/deceleration time control circuit, or a set value of a PI controller, or the AC motor 2 repeatedly performs a decelerating operation caused by a power failure and an accelerating operation by normal control, which makes it difficult to perform smooth and continuous driving.

Figure 7:
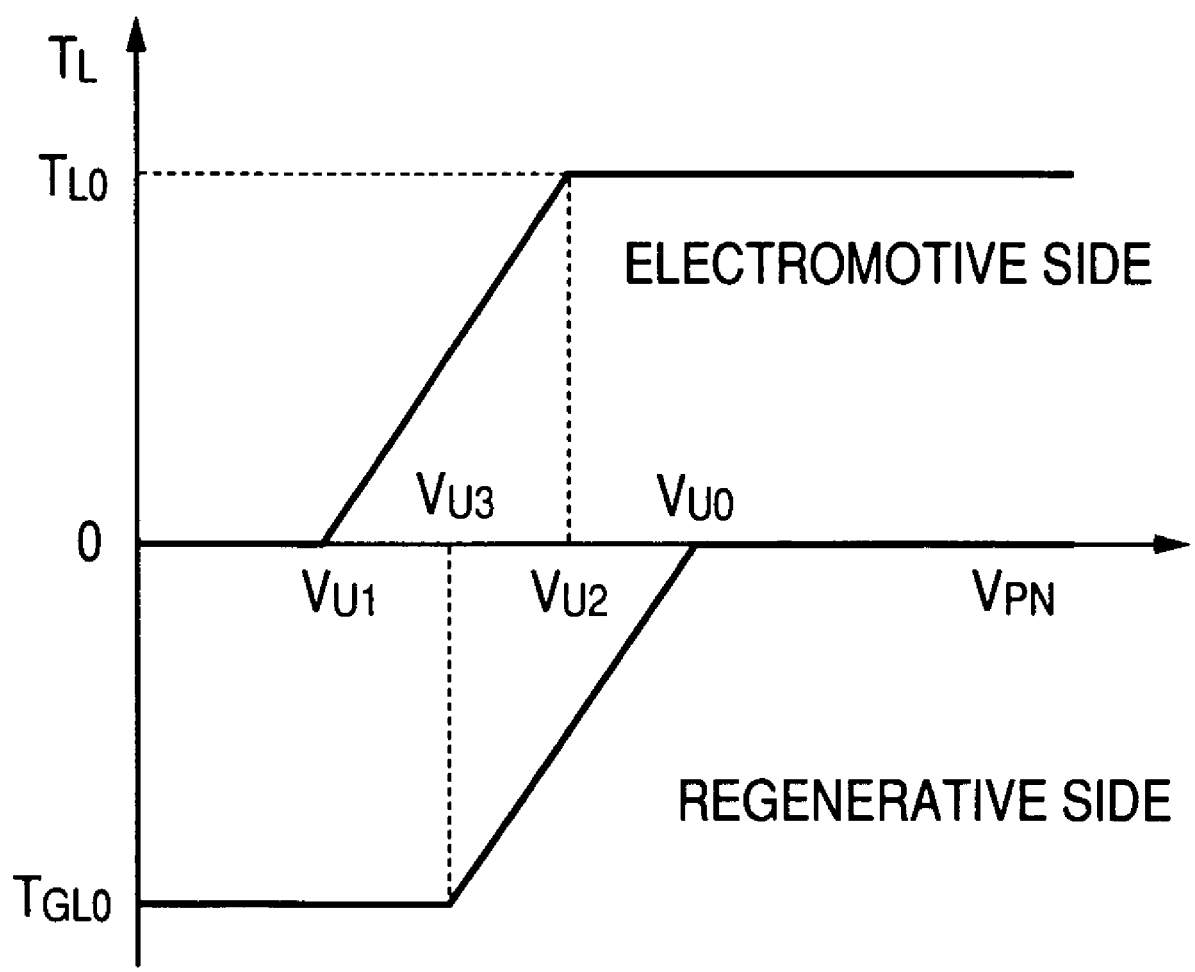
[FIG. 7]

FIG. 7 shows the relationship between the DC intermediate voltage $V_{PN}$ and a torque limit value when the power failure signal is maintained at the level of '1'. The electromotive torque limit value and the regenerative torque limit value are controlled on the basis of the level of the DC intermediate voltage $V_{PN}$.

That is, when the DC intermediate voltage $V_{PN}$ is higher than a level $V_{UV1}$, the electromotive torque limit value is set to a predetermined electromotive torque limit value $T_{L0}$. On the other hand, when the DC intermediate voltage $V_{PN}$ is lower than a second UV level $V_{UV2}$ where the power converter 1 cannot be operated, the electromotive torque limit value is set to zero so as not to generate electromotive torque. When the DC intermediate voltage $V_{PN}$ is higher than the level $V_{UV2}$ and lower than the voltage $V_{UV1}$, the electromotive torque limit value rises from zero to a predetermined torque limit value $T_{L0}$ in proportion to the DC intermediate voltage $V_{PN}$. In general, the range of the electromotive torque limit value is gradually narrowed, as the DC intermediate voltage $V_{PN}$ becomes lower than the level $V_{UV1}$. Therefore, this setting prevents the DC intermediate voltage from being further lowered due to the lowering of the DC intermediate voltage $V_{PN}$.

Meanwhile, when the DC intermediate voltage $V_{dc}$ is lower than a third UV level $V_{UV3}$, the regenerative torque limit value turns to a predetermined regenerative torque limit value $T_{GL0}$. On the other hand, when the DC intermediate voltage $V_{PN}$ is higher than a fourth UV level $V_{UV4}$, the regenerative torque limit value is set to zero so as not to generate regenerative torque. When the DC intermediate voltage $V_{PN}$ is higher than the level $V_{UV3}$ and the lower than the level $V_{UV4}$, the regenerative torque limit value is lowered from the predetermined torque limit value $T_{GL0}$ to zero in proportion to the DC intermediate voltage $V_{PN}$. In general, the range of the regenerative torque limit value is gradually narrowed, as the DC intermediate voltage $V_{PN}$ becomes higher than the level $V_{UV3}$. Therefore, this setting prevents the DC intermediate voltage from being further raised due to a rise in the DC intermediate voltage $V_{PN}$.

In this way, it is possible to control the torque instruction by setting the electromotive torque limit value and the regenerative torque limit value on the basis of the level of the DC intermediate voltage $V_{PN}$. Therefore, it is possible to stably control the DC intermediate voltage $V_{PN}$, for example, at the time of an instantaneous power failure and to smoothly and continuously drive the AC motor.

In FIG. 7, the third UV level $V_{UV3}$ is set to an arbitrary value. However, the third UV level $V_{UV3}$ may be equal to the second UV level $V_{UV2}$. The fourth UV level $V_{UV4}$ is set to an arbitrary value. However, the fourth UV level $V_{UV4}$ may be equal to the first UV level $V_{UV1}$. The torque limit value is changed in proportion to the DC intermediate voltage $V_{PN}$. However, any relationship may be established therebetween.

Sixth Embodiment

Figure 8:
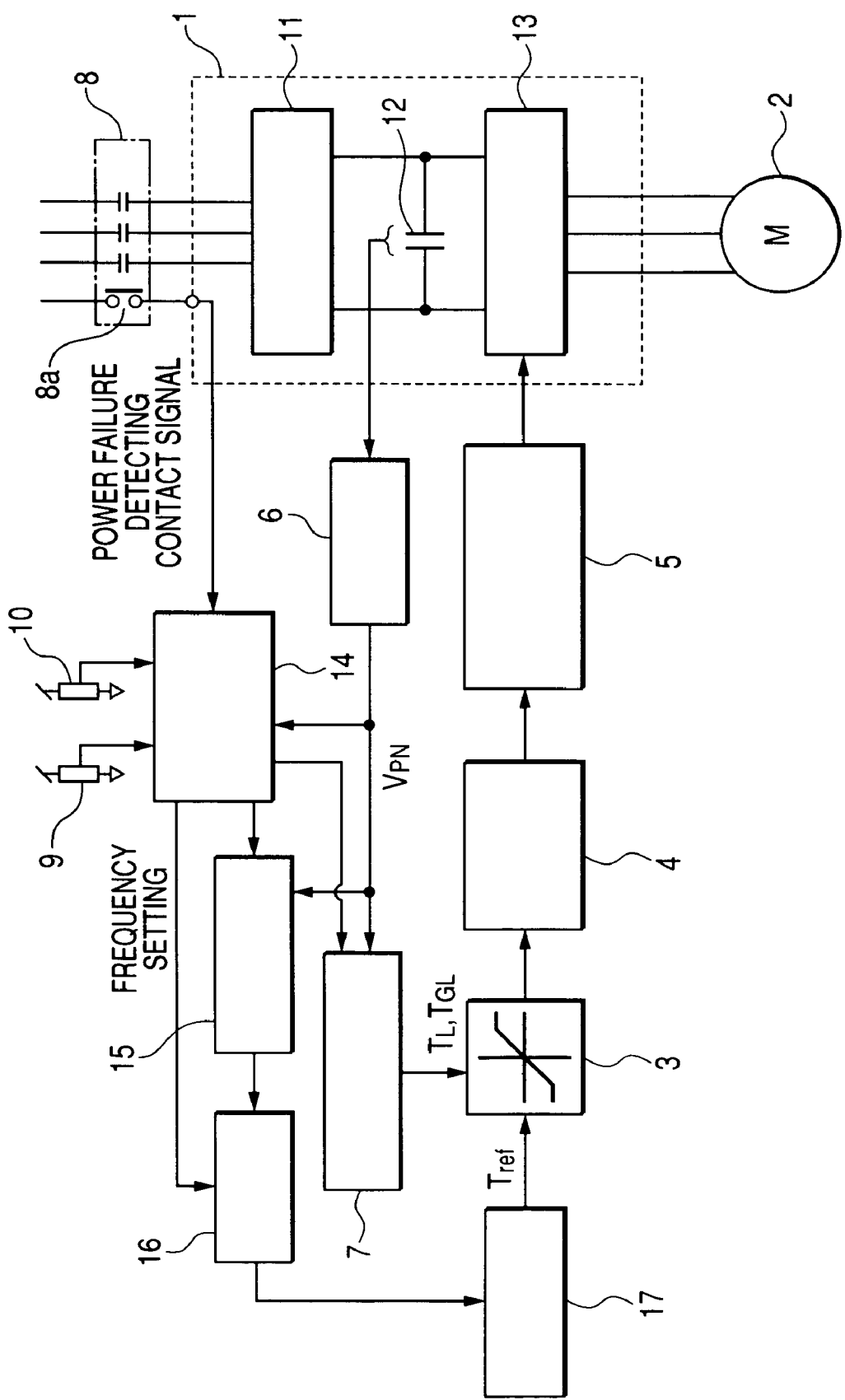
[FIG. 8]
Figure 9:
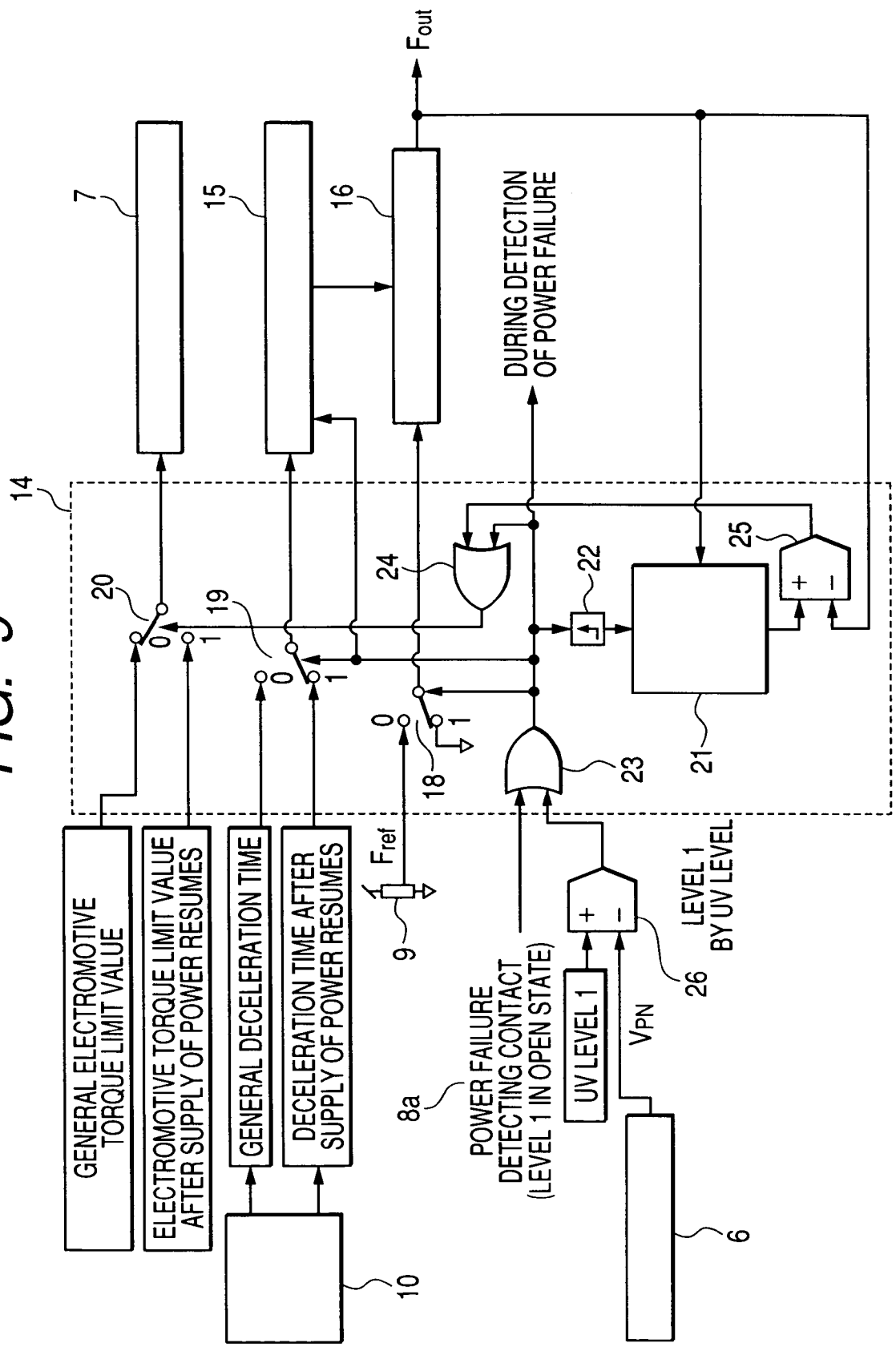
[FIG. 9]

FIG. 8 is a block diagram illustrating the structure of a control device for an alternating current motor according to a sixth embodiment of the invention. FIG. 9 is a block diagram illustrating a sequence circuit for selecting an acceleration/deceleration time, a frequency instruction, and an electromotive torque limit value during the detection of a power failure.

In FIG. 8, the control device for the AC motor according to this embodiment includes: a power converter 1 having a converter unit 11 for converting a three-phase alternating current supplied from a three-phase alternating current power supply (not shown) through an electromagnetic contactor 8 into a DC voltage by using a power element, a smoothing capacitor 12 for smoothing the converted voltage, and an inverter unit 13 for converting a DC intermediate voltage into an AC voltage having a predetermined frequency by a PWM control manner; an AC motor 2 which is driven by an alternating current output from the inverter unit 13; a torque limit circuit 3 for controlling a torque instruction so as to be between a predetermined electromotive torque limit value and a predetermined regenerative torque limit value; a voltage instruction calculating unit 4 for calculating a voltage instruction allowing torque to be output according to the torque instruction output from the torque limit circuit 3 and for outputting the voltage instruction; a switching pattern generating circuit 5 for determining a switching pattern of the power converter 1 on the basis of the output of the voltage instruction calculating unit 4; a voltage detecting circuit 6 for detecting a DC intermediate voltage $V_{PN}$, which is a voltage of the smoothing capacitor 12; a torque limit value calculating circuit 7 for calculating the DC intermediate voltage $V_{PN}$ output from the voltage detecting circuit 6 and for setting an electromotive torque limit value $T_L$ and a regenerative torque limit value $T_{GL}$ output from a sequence circuit 14; a frequency setting unit 9 for setting an output frequency; an acceleration/deceleration time setting unit 10 for setting an acceleration/deceleration time when the AC motor 2 is accelerated or decelerated from a stop state until the maximum output frequency is output; the sequence circuit 14 for detecting a power failure, on the basis of a power failure detecting signal from a power failure detecting contact 8a of the electromagnetic contactor 8, and for setting the frequency instruction and the deceleration time during the detection of the power failure; an acceleration/deceleration time control circuit 15 for controlling the deceleration time such that the DC intermediate voltage $V_{PN}$ is made constant by PI control during the detection of the power failure; a soft starter 16 for raising or lowering the output frequency for a predetermined acceleration/deceleration time; and a speed control circuit 17 for outputting a torque instruction on the basis of the frequency output from the soft starter 16.

As shown in FIG. 9, in the sequence circuit 14, a first switching unit 18 performs switching between a general frequency instruction output from the frequency setting unit 9 and a frequency instruction output at the time of a power failure to output the frequency instruction to the soft starter 16, in response to a power failure detecting signal output based on a low voltage detection output signal output from the voltage detecting circuit 6 (which is output when the DC intermediate voltage $V_{PN}$ is lower than a set UV level of 1) or a power failure output signal output from the power failure detecting contact 8a of the electromagnetic contactor 8. A second switching unit 19 selects one of a general deceleration time output from the acceleration/deceleration time setting unit 10 and a deceleration time during the detection of the power failure and outputs the selected time to the acceleration/deceleration time control circuit 15. An edge trigger detecting circuit 22 detects a point of time when the power failure detecting signal turns from '0' to '1'. An output frequency storage circuit 21 before the power failure stores an output frequency when the edge trigger detecting circuit 22 detects the power failure. A third switching unit 20 selects one of a general electromotive torque limit value and an electromotive torque limit value after the supply of power resumes and outputs the selected value to the torque limit value calculating circuit 7 when the power failure detecting signal is maintained at the level of '1' and until the output frequency output from the soft contactor is equal to the output frequency stored in the output frequency storage circuit 21 before the power failure when the power failure detecting signal is at the level of '0'. In FIG. 9, reference numerals 23 and 24 denote OR circuits, and reference numerals 25 and 26 indicate comparators.

Next, a description will be made below of a method of controlling continuous driving during the detection of a power failure in the control device for the AC motor according to this embodiment.

When an instantaneous power failure occurs in an AC power supply, the electromagnetic contactor 8 (FIG. 8) is opened, which causes the power failure detecting contact turns to '1' in level or the DC intermediate voltage of the smoothing capacitor 12 to be lower than a UV level $1V_{UV1}$. Then, the voltage detecting circuit 6 for detecting the DC intermediate voltage detects the power failure. When the power failure is detected, the power failure detecting contact signal turns to '1' in level, or the low voltage detecting signal is turned to '1' in level by the DC intermediate voltage $V_{PN}$ detected by the voltage detecting circuit 6, as shown in FIG. 9. Then, the signals are input to the sequence circuit 14. In the sequence circuit 14, when the power failure detecting contact signal is at the level of '1' or the low voltage detecting signal is at the level of '1', the power failure detecting signal turns to '1' in level. The frequency instruction is switched to 0 by the first and second switching units 18 and 19, so that the deceleration time is switched to the set deceleration time during the detection of a power failure, and the output frequency when the power failure is detected is stored in the output frequency storage circuit 12 before the power failure. When the power converter 1 for controlling the driving of the AC motor 2 is changed from a normal driving mode to a deceleration mode, rotational energy corresponding to the reduction rate of the AC motor is transformed into regenerative power by the inverter unit 13, and the smoothing capacitor 12 forming a DC intermediate circuit is charged, causing the terminal voltage thereof to rise. When the power failure detecting signal turns to '1' in level, the acceleration/deceleration time control circuit 15 controls a reduction rate by a PI control manner, referring to the level of the DC intermediate voltage $V_{PN}$ and the variation of the DC intermediate voltage, such that the DC intermediate voltage $V_{PN}$ detected by the voltage detecting circuit 6 is equal to an input voltage set value×1.35. In this way, the rotational speed of the AC motor 2 is lowered not rapidly but slowly, which enables the motor to be continuously driven during the instantaneous power failure. When a rise in the DC intermediate voltage $V_{PN}$ is detected, or when the DC intermediate voltage $V_{PN}$ is higher than the voltage before the power failure is detected, deceleration stops. When the supply of power is resumed by the AC power supply of the inverter unit 13, the power failure detecting contact 8a of the electromagnetic contactor 8 is closed, and the DC intermediate voltage $V_{PN}$ is higher than the low voltage detecting level, so that the AC motor is returned to the normal driving mode. The electromotive torque limit value is selected as the electromotive torque limit value after the supply of power resumes, until the output frequency output from the soft starter is equal to the output frequency stored in the output frequency storage circuit 21 before the power failure. The torque limit value calculating circuit 7 defines the relationship between the DC intermediate voltage $V_{PN}$ and the torque limit value shown in FIG. 7, and controls the electromotive torque limit value and the regenerative torque limit value on the basis of the level of the DC intermediate voltage $V_{PN}$. Therefore, the AC motor is driven by one of the electromotive torque limit value output from the sequence circuit 14 and the electromotive limit value determined by the level of the DC intermediate voltage $V_{PN}$ having a smaller value. When the output frequency output from the soft starter is equal to the output frequency stored in the output frequency storage circuit 21 before the power failure, the AC motor is accelerated or decelerated by one of the electromotive torque limit value generally set and the electromotive limit value determined by the level of the DC intermediate voltage $V_{PN}$ having a smaller value, until the output frequency thereof approaches is equal to a frequency set value. In this way, it is possible to continuously drive an AC motor when a power failure is detected.

INDUSTRIAL APPLICABILITY

According to the invention, it is possible to continuously drive an AC motor at the time of an instantaneous power failure. An electromotive torque limit value and a regenerative torque limit value are set on the basis of the level of a DC intermediate voltage (the smoothing capacitor 12) to control a torque instruction, which makes it possible to control the DC intermediate voltage to be constant, without using a regenerative resistor or an apparatus for feeding back regenerative energy to a power supply circuit, and thus to stably and continuously drive the AC motor at the time of the instantaneous power failure. For example, in a textile machine, speed control is performed such that a fixed relationship is established among the speeds of a plurality of motors, and thus it is possible to prevent thread from being cut due to the free run (coasting) of an AC motor at the time of an instantaneous power failure.

The invention claimed is:

1. A method of controlling an alternating current motor and a power converter including:
   a converter unit for converting an alternating current voltage supplied from an alternating current power supply into a direct current voltage, and
   a smoothing capacitor for smoothing the converted direct current voltage, and
   an inverter unit for converting a direct current intermediate voltage into an alternating current voltage having a frequency corresponding to a torque instruction by a PWM control manner,
   by setting an electromotive torque limit value and a regenerative torque limit value in advance, and by restricting the torque instruction with the torque limit values to generate a PWM switching pattern to be output to the inverter unit, the method comprising the steps of:
   allowing a power failure detecting unit provided in the power converter to detect a power failure of the alternating current power source;
   outputting a deceleration start instruction to the inverter unit in response to a power failure detecting signal output from the power failure detecting unit;
   calculating a first reduction rate, on the basis of a detection value and a target value of the direct current intermediate voltage, such that the direct current intermediate voltage is made constant during the deceleration of the alternating current motor;
   calculating a second reduction rate on the basis of a variation in the direct current intermediate voltage;
   controlling a deceleration time by controlling a value obtained by multiplying the two reduction rates together in a PI control manner;
   calculating the torque instruction to allow the alternating current motor to be decelerated for the deceleration time;
   changing the electromotive torque limit value and the regenerative torque limit value on the basis of the value of the detected direct current intermediate voltage;
   stopping the deceleration when the direct current intermediate voltage is equal to a voltage before the power failure is detected or it rises during the deceleration; and
   when the alternating current motor is returned to a normal control mode, storing an output frequency before the power failure is detected.

2. The method of controlling an alternating current motor according to claim 1, wherein
   when the direct current intermediate voltage is equal to the voltage before the power failure is detected or it rises during the deceleration, the deceleration stops, and
   when the alternating current motor is returned to the normal control mode, the alternating motor is accelerated for an arbitrary acceleration time until its output frequency is equal to the output frequency stored before the power failure is detected.

3. The method of controlling an alternating current motor according to claim 1, wherein
   when the direct current intermediate voltage is equal to the voltage before the power failure is detected or it rises during the deceleration, the deceleration stops, and
   when the alternating current motor is returned to the normal control mode, a torque limit unit restricts the torque instruction with an arbitrary electromotive torque limit value until the output frequency of the alternating current motor is equal to the output frequency stored before the power failure is detected.

4. A control device which controls an alternating current motor and a power converter including:
   a converter unit for converting an alternating current voltage supplied from an alternating current power supply into a direct current voltage,
   a smoothing capacitor for smoothing the converted direct current voltage, and
   an inverter unit for converting a direct current intermediate voltage into an alternating current voltage having a frequency corresponding to a torque instruction by a PWM control manner,
   by setting an electromotive torque limit value and a regenerative torque limit value in advance, and by restricting the torque instruction with the torque limit values to generate a PWM switching pattern to be output to the inverter unit, the control device comprising:

a power failure detecting unit which detects a power failure of the alternating current power source;

a unit which outputs a deceleration start instruction to the inverter unit in response to a power failure detecting signal output from the power failure detecting unit, calculates a first reduction rate, on the basis of a detection value and a target value of the direct current intermediate voltage, such that the direct current intermediate voltage is made constant during the deceleration of the alternating current motor, and calculates a second reduction rate on the basis of a variation in the direct current intermediate voltage;

a unit which controls a deceleration time by controlling a value obtained by multiplying the two reduction rates together in a PI control manner;

a unit which calculates the torque instruction to allow the alternating current motor to be decelerated for the deceleration time and changes the electromotive torque limit value and the regenerative torque limit value on the basis of the value of the detected direct current intermediate voltage;

a unit which stops the deceleration when the direct current intermediate voltage is equal to a voltage before the power failure is detected or it rises during the deceleration; and a unit which stores an output frequency before the power failure is detected when the alternating current motor is returned to a normal control mode.

5. The control device for an alternating current motor according to claim 4, wherein when the direct current intermediate voltage is equal to the voltage before the power failure is detected or it rises during the deceleration, the deceleration stops, and when the alternating current motor is returned to the normal control mode, the alternating motor is accelerated for an arbitrary acceleration time until its output frequency is equal to the output frequency stored before the power failure is detected.

6. The control device for an alternating current motor according to claim 4, wherein when the direct current intermediate voltage is equal to the voltage before the power failure is detected or it rises during the deceleration, the deceleration stops, and when the alternating current motor is returned to the normal control mode, the torque limit unit restricts the torque instruction with an arbitrary electromotive torque limit value until the output frequency of the alternating current motor is equal to the output frequency stored before the power failure is detected.

7. A method of controlling an alternating current motor and a power converter including:

a converter unit for converting an alternating current voltage supplied from an alternating current power supply into a direct current voltage, a smoothing capacitor for smoothing the converted direct current voltage, and an inverter unit for converting a direct current intermediate voltage into an alternating current voltage having a frequency corresponding to a torque instruction by a PWM control manner, the method comprising the steps of:

setting an electromotive torque limit value and a regenerative torque limit value in advance;

restricting the torque instruction with the torque limit values to generate a PWM switching pattern to be output to the inverter unit;

setting a lower limit voltage $V_{U1}$ of the direct current intermediate voltage required for a normal driving mode, a lower allowable voltage $V_{U0}$ of the direct current intermediate voltage when a lowest voltage of a power supply is input, and a power failure detecting level voltage $V_{U2}$ which is lower than the lower allowable voltage $V_{U0}$ and is higher than the lower limit voltage $V_{U1}$;

when a detection value of the direct current intermediate voltage output from a direct current intermediate voltage detecting circuit is lower than the power failure detecting level voltage $V_{U2}$ during the driving of the alternating current motor, decelerating the alternating current motor at a reduction rate $\alpha_d$ until the direct current intermediate voltage is higher than the lower allowable voltage $V_{U0}$;

when the direct current intermediate voltage is higher than the lower allowable voltage $V_{U0}$, returning the alternating current motor to a normal control mode; and when the direct current intermediate voltage is higher than the lower allowable voltage $V_{U0}$ to cause the alternating current motor to be returned to the normal control mode, storing an output frequency before the power failure is detected.

8. The method of controlling an alternating current motor according to claim 7, wherein when the direct current intermediate voltage is higher than the lower allowable voltage $V_{U0}$ to cause the alternating current motor to be returned to the normal control mode, the alternating current motor is accelerated for an arbitrary acceleration time until its output frequency is equal to the output frequency stored before the power failure is detected.

9. The method of controlling an alternating current motor according to claim 7, wherein when the direct current intermediate voltage is higher than the lower allowable voltage $V_{U0}$ to cause the alternating current motor to be returned to the normal control mode, a torque limit unit restricts the torque instruction with an arbitrary electromotive torque limit value until the output frequency of the alternating current motor is equal to the output frequency stored before the power failure is detected.

10. A control device which controls an alternating current motor and a power converter including:

a converter unit for converting an alternating current voltage supplied from an alternating current power supply into a direct current voltage, a smoothing capacitor for smoothing the converted direct current voltage, and an inverter unit for converting a direct current intermediate voltage into an alternating current voltage having a frequency corresponding to a torque instruction by a PWM control manner, the control device controlling the alternating current motor in the following sequence of:

setting an electromotive torque limit value and a regenerative torque limit value in advance;

restricting the torque instruction with the torque limit values to generate a PWM switching pattern to be output to the inverter unit;

setting a lower limit voltage $V_{U1}$ of the direct current intermediate voltage required for a normal driving mode, a lower allowable voltage $V_{U0}$ of the direct current intermediate voltage when a lowest voltage of a power supply is input, and a power failure detecting level voltage $V_{U2}$ which is lower than the lower allowable voltage $V_{U0}$ and is higher than the lower limit voltage $V_{U1}$;

when a detection value of the direct current intermediate voltage output from a direct current intermediate voltage detecting circuit is lower than the power failure detecting level voltage $V_{U2}$ during the driving of the alternating current motor, decelerating the alternating current motor at a reduction rate $\alpha_d$ until the direct current intermediate voltage is higher than the lower allowable voltage $V_{U0}$;

when the direct current intermediate voltage is higher than the lower allowable voltage $V_{U0}$, returning the alternating current motor to a normal control mode; and when the direct current intermediate voltage is higher than the lower allowable voltage $V_{U0}$ to cause the alternating current motor to be returned to the normal control mode, storing an output frequency before the power failure is detected.

11. The control device for an alternating current motor according to claim 10, wherein when the direct current intermediate voltage is higher than the lower allowable voltage $V_{U0}$ to cause the alternating current motor to be returned to the normal control mode, the alternating current motor is accelerated for an arbitrary acceleration time until its output frequency is equal to the output frequency stored before the power failure is detected.

12. The control device for an alternating current motor according to claim 10, wherein when the direct current intermediate voltage is higher than the lower allowable voltage $V_{U0}$ to cause the alternating current motor to be returned to the normal control mode, a torque limit unit restricts the torque instruction with an arbitrary electromotive torque limit value until the output frequency of the alternating current motor is equal to the output frequency stored before the power failure is detected.

13. A method of controlling an alternating current motor, comprising the steps of:

providing a power failure detecting unit for detecting a power failure of the alternating current motor in a power converter;

outputting a deceleration start instruction to an inverter unit in response to a power failure detecting signal output from the power failure detecting unit;

calculating a first reduction rate, on the basis of a detection value and a target value of a direct current intermediate voltage, such that a direct current intermediate voltage is made constant during the deceleration of the alternating current motor;

calculating a second reduction rate on the basis of a variation in the direct current intermediate voltage;

controlling a deceleration time by controlling a value obtained by multiplying the two reduction rates together in a PI control manner;

when the direct current intermediate voltage is equal to a voltage before the power failure is detected or it rises during the deceleration, stopping the deceleration and returning the alternating current motor to a normal control mode; and when the direct current intermediate voltage is equal to the voltage before the power failure is detected or it rises during the deceleration to cause the deceleration to stop and the alternating current motor to be returned to the normal control mode, storing an output frequency before the power failure is detected.

14. The method of controlling an alternating current motor according to claim 13, wherein when the direct current intermediate voltage is equal to the voltage before the power failure is detected or it rises during the deceleration to cause the deceleration to stop and the alternating current motor to be returned to the normal control mode, the alternating current motor is accelerated for an arbitrary acceleration time until its output frequency is equal to the output frequency stored before the power failure is detected.

15. A control device which controls an alternating current motor, comprising:

a power converter; and a power failure detecting unit which detects a power failure of the alternating current motor and is provided in the power converter, wherein a deceleration start instruction is output to an inverter unit in response to a power failure detecting signal output from the power failure detecting unit, a first reduction rate is calculated, on the basis of a detection value and a target value of a direct current intermediate voltage, such that a direct current intermediate voltage is made constant during the deceleration of the alternating current motor, a second reduction rate is calculated on the basis of a variation in the direct current intermediate voltage, a value obtained by multiplying the two reduction rates together is controlled in a PI control manner to control a deceleration time, when the direct current intermediate voltage is equal to a voltage before the power failure is detected or it rises during the deceleration, a torque instruction is calculated to allow deceleration to stop and the alternating current motor to be decelerated for the deceleration time, and returning the alternating current motor to a normal control mode, an electromotive torque limit value and a regenerative torque limit value are changed on the basis of the value of the detected direct current intermediate voltage, a torque limit unit restricts the torque instruction, and when the direct current intermediate voltage is equal to a voltage before the power failure is detected or it rises during the deceleration to cause the deceleration to stop and the alternating current motor to be returned to the normal control mode, an output frequency before the power failure is detected is stored.

16. The method of controlling an alternating current motor according to claim 15, wherein when the direct current intermediate voltage is equal to the voltage before the power failure is detected or it rises during the deceleration to cause the deceleration to stop and the alternating current motor to be returned to the normal control mode, the alternating current motor is accelerated for an arbitrary acceleration time until its output frequency is equal to the output frequency stored before the power failure is detected.

17. A method of controlling an alternating current motor, comprising the steps of:

setting a lower limit voltage $V_{U1}$ of a direct current intermediate voltage required for a normal driving mode, a lower allowable voltage $V_{U0}$ of the direct current intermediate voltage when a lowest voltage of a power supply is input, and a power failure detecting level voltage $V_{U2}$ which is lower than the lower allowable voltage $V_{U0}$ and is higher than the lower limit voltage $V_{U1}$;

when a detection value of the direct current intermediate voltage output from a direct current intermediate voltage detecting circuit is lower than the power failure detecting level voltage $V_{U2}$ during the driving of the alternating current motor, decelerating the alternating current motor at a reduction rate $\alpha_d$ until the direct current intermediate voltage is higher than the lower allowable voltage $V_{U0}$;

when the direct current intermediate voltage is higher than the lower allowable voltage $V_{U0}$, returning the alternating current motor to a normal control mode; and when the direct current intermediate voltage is higher than the lower allowable voltage $V_{U0}$ to cause the alternating current motor to be returned to the normal control mode, storing an output frequency before the power failure is detected.

18. The method of controlling an alternating current motor according to claim 17, wherein when the direct current intermediate voltage is higher than the lower allowable voltage $V_{U0}$ to cause the alternating current motor to be returned to the normal control mode, the alternating current motor is accelerated for an arbitrary acceleration time until its output frequency is equal to the output frequency stored before the power failure is detected.

19. A control device for an alternating current motor, comprising:

a sequence unit which performs the functions of:

setting a lower limit voltage $V_{U1}$ of a direct current intermediate voltage required for a normal driving mode, a lower allowable voltage $V_{U0}$ of the direct current intermediate voltage when a lowest voltage of a power supply is input, and a power failure detecting level voltage $V_{U2}$ which is lower than the lower allowable voltage $V_{U0}$ and is higher than the lower limit voltage $V_{U1}$;

when a detection value of the direct current intermediate voltage output from a direct current intermediate voltage detecting circuit is lower than the power failure detecting level voltage $V_{U2}$ during the driving of the alternating current motor, decelerating the alternating current motor at a reduction rate $\alpha_d$ until the direct current intermediate voltage is higher than the lower allowable voltage $V_{U0}$; and when the direct current intermediate voltage is higher than the lower allowable voltage $V_{U0}$, returning the alternating current motor to a normal control mode, when the direct current intermediate voltage is higher than the lower allowable voltage $V_{U0}$ to cause the alternating current motor to be returned to the normal control mode, storing an output frequency before the power failure is detected.

20. The control device for an alternating current motor according to claim 19, wherein when the direct current intermediate voltage is higher than the lower allowable voltage $V_{U0}$ to cause the alternating current motor to be returned to the normal control mode, the alternating current motor is accelerated for an arbitrary acceleration time until its output frequency is equal to the output frequency stored before the power failure is detected.

\* \* \* \* \*